US012625247B2

(12) United States Patent
Yu et al.

(10) Patent No.: US 12,625,247 B2
(45) Date of Patent: May 12, 2026

(54) SEMICONDUCTOR DEVICE PACKAGE AND A METHOD OF MANUFACTURING THE SAME

(71) Applicant: Advanced Semiconductor Engineering, Inc., Kaohsiung (TW)

(72) Inventors: Yuanhao Yu, Kaohsiung (TW); Chung Ju Yu, Kaohsiung (TW); Wei-Fan Wu, Kaohsiung (TW); Chai-Chi Lin, Kaohsiung (TW); Hong Jie Chen, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 1175 days.

(21) Appl. No.: 17/324,965

(22) Filed: May 19, 2021

(65) Prior Publication Data

US 2022/0373670 A1 Nov. 24, 2022

(51) Int. Cl.
*G01S 13/58* (2006.01)
*H01Q 1/22* (2006.01)
*H01Q 1/27* (2006.01)

(52) U.S. Cl.
CPC ........... *G01S 13/58* (2013.01); *H01Q 1/2283* (2013.01); *H01Q 1/273* (2013.01)

(58) Field of Classification Search
CPC .... H01L 25/165; H01Q 1/2283; H01Q 1/273; G08C 17/02; G01S 13/58
See application file for complete search history.

2

(56) References Cited

U.S. PATENT DOCUMENTS

| | | | | |
|---|---|---|---|---|
| 10,025,354 | B2 * | 7/2018 | Kwon | G06F 1/1635 |
| 10,056,922 | B1 * | 8/2018 | Tsvelykh | H01P 1/20 |
| 10,218,407 | B2 * | 2/2019 | Trotta | G01S 13/88 |
| 10,775,490 | B2 * | 9/2020 | Baheti | G01S 7/04 |
| 11,204,411 | B2 * | 12/2021 | Jungmaier | G01S 7/032 |
| 2013/0343564 | A1 * | 12/2013 | Darlington | H04R 1/1083 |
| | | | | 381/74 |
| 2016/0178730 | A1 * | 6/2016 | Trotta | G01S 13/931 |
| | | | | 342/175 |
| 2016/0259037 | A1 * | 9/2016 | Molchanov | G01S 7/0233 |
| 2016/0320853 | A1 * | 11/2016 | Lien | G06F 3/011 |
| 2018/0026377 | A1 * | 1/2018 | Trotta | H01Q 1/2283 |
| | | | | 343/872 |
| 2018/0233465 | A1 * | 8/2018 | Spella | H01Q 19/28 |
| 2018/0353086 | A1 * | 12/2018 | Turner | G01S 7/41 |
| 2019/0064344 | A1 * | 2/2019 | Turner | G08B 21/02 |

(Continued)

FOREIGN PATENT DOCUMENTS

| | | |
|---|---|---|
| CN | 110018471 A | 7/2019 |
| CN | 111736688 A | 10/2020 |
| WO | WO-2018101767 A1 * | 6/2018 ........... H01L 23/498 |

OTHER PUBLICATIONS

WO-2018101767-A1 translation (Year: 2018).*

*Primary Examiner* — Matthew M Barker
(74) *Attorney, Agent, or Firm* — Foley & Lardner LLP

(57) ABSTRACT

At least some embodiments of the present disclosure relate to a wearable device. The wearable device comprises a substrate, a detecting module disposed on the substrate, and a control module disposed on the substrate. The control module is electrically connected to the detecting module. The control module is configured to receive a signal from the detecting module and to control the wearable device in response to the signal.

19 Claims, 30 Drawing Sheets

(56) References Cited

U.S. PATENT DOCUMENTS

| | | | | |
|---|---|---|---|---|
| 2019/0101636 A1* | 4/2019 | Trotta | ........................ | G01S 7/41 |
| 2019/0212436 A1 | 7/2019 | Baheti et al. | | |
| 2021/0026178 A1* | 1/2021 | Wang | ..................... | H01Q 1/243 |
| 2022/0263562 A1* | 8/2022 | Park | .................... | H04W 52/346 |
| 2022/0382381 A1* | 12/2022 | Baheti | ................. | H01Q 9/0457 |

* cited by examiner

1000'

SEMICONDUCTOR DEVICE PACKAGE AND A METHOD OF MANUFACTURING THE SAME

BACKGROUND

1. Technical Field

The present disclosure relates to a semiconductor device package. More particularly, the present disclosure relates to a semiconductor device package having multiple antenna modules operating in different frequency bands.

2. Description of the Related Art

Wearable devices, such as true wireless stereo (TWS) headphones, typically include antennas for transmitting and receiving radio frequency (RF) signals. The wearable devices can provide functionality of receiving a call and rejecting a call. As functionality of wearable devices increases, integration of more functional elements into the devices is a major industry priority.

SUMMARY

In some embodiments, according to one aspect, a wearable device comprises a substrate, a detecting module disposed on the substrate, and a control module disposed on the substrate. The control module is electrically connected to the detecting module. The control module is configured to receive a signal from the detecting module and to control the wearable device in response to the signal.

In some embodiments, according to another aspect, a semiconductor device package comprises a first substrate, a first antenna, a detecting controller, a second antenna, and a wearable device controller. The first antenna is disposed on the first substrate. The detecting controller is disposed on the first substrate. The second antenna is disposed on the first substrate. The wearable device controller is disposed on the first substrate. The first antenna and the detecting controller are integrated into a detecting module and the second antenna and the wearable device controller into a control module.

In some embodiments, according to another aspect, a method is disclosed for manufacturing a semiconductor device package. The method includes: providing a substrate, disposing a wearable device controller and a first antenna on the substrate; and disposing a gesture-detecting controller and a second antenna on the substrate, wherein the first antenna and the wearable device controller are integrated into a control module and the second antenna and the gesture-detecting controller are integrated into a detecting module.

DETAILED DESCRIPTION

Figure 1:
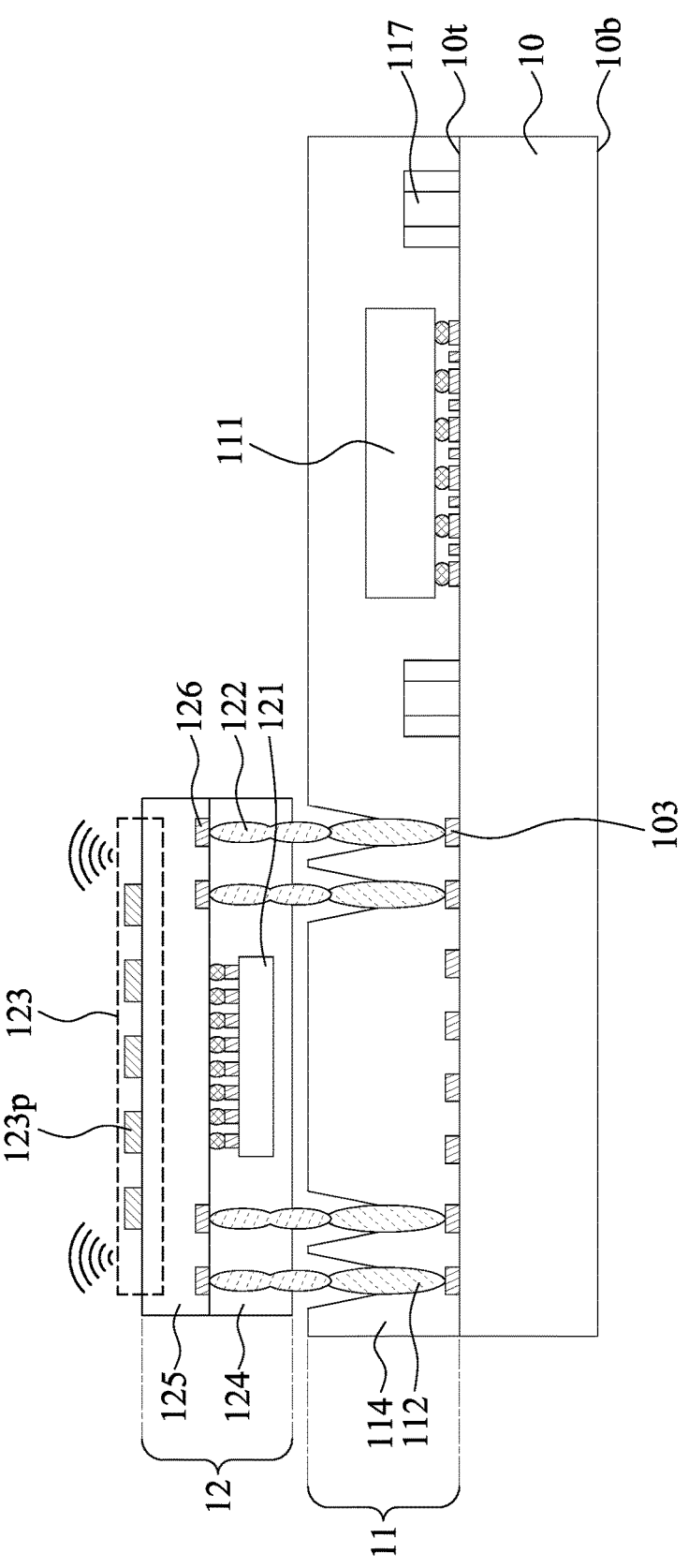
FIG. 1 is a cross-section of a semiconductor device package according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

Spatial descriptions, such as "above," "below," "up," "left," "right," "down," "top," "bottom," "vertical," "horizontal," "side," "higher," "lower," "upper," "over," "under," and so forth, are specified with respect to a certain component or group of components, or a certain plane of a component or group of components, for the orientation of the component(s) as shown in the associated figure. It should be understood that the spatial descriptions used herein are for purposes of illustration only, and that practical implementations of the structures described herein can be spatially arranged in any orientation or manner, provided that the merits of the embodiments of this disclosure are not deviated from by such arrangement.

FIG. 1 is a cross-section of a semiconductor device package 1 in accordance with some embodiments of the present disclosure. The semiconductor device package 1 includes a substrate 10, a control module 11, and a detecting/antenna module 12. The semiconductor device package 1 may be included in a wearable device. Said wearable device may be (or include) an earphone, a smart watch, a smart band, smart glasses, or so on.

The substrate 10 includes a top surface 10t and a bottom surface 10b opposite thereto. The substrate 10 includes a patterned conductive layer 103 adjacent to the top surface 10t. The patterned conductive layer 103 may be conductive traces or conductive pads. In some embodiments, the substrate 10 may be or may include, for example, a printed circuit board, such as a paper-based copper foil laminate, a composite copper foil laminate, or a polymer-impregnated glass-fiber-based copper foil laminate. The substrate 10 may include a core layer which is made of a bismaleimide-triazine (BT) resin or a glass-reinforced epoxy composite (e.g., an FR-4 composite). The substrate 10 may include an interconnection structure, such as a redistribution layer (RDL) or a grounding element.

The control module 11 is disposed on the top surface 10t of the substrate 10. The control module 11 includes an active component 111, an interconnection element 112, an encapsulant 114, and a passive component 117. The active component 111, the interconnection element 112, and the passive component 117 are disposed on the top surface 10t of the substrate 10.

The control module 11 is electrically connected with the detecting module 12 through, for example, the interconnection element 112. The control module 11 is configured to receive a signal from the detecting module 12 and to control the wearable device in response thereto. The active component 111 of the control module 11 may be configured to receive or transmit signals. The control module 11 may be configured to receive different signals from the detecting module 12 and control the wearable device according thereto. The operations of the wearable device may correspond to respective signals. In some embodiments, the operations of the wearable device may include receiving a call, rejecting a call, volume or microphone control, touch panel switching, proximity sensor reception, noise reduction, external device boot, shutdown, and so on. In some embodiments, the control module 11 may be configured to send commands including playback and control of an external device storing music or other media.

The active component 111 may include one or more of a controller, processor, digital signal processor (DSP), application-specific integrated circuit (ASIC), or other electronic component or semiconductor device. The active component 111 may be a wearable device controller. The active component 111 may control electronic components such as an antenna, Bluetooth module, speaker, or microphone.

The passive component 117 may be a resistor, capacitor, inductor, or combination thereof. The passive component 117 is integrated into the control module 11. The active component 111, the interconnection element 112, and the passive component 117 are encapsulated by the encapsulant 114. The interconnection element 112 is exposed by the encapsulant 114. For example, the encapsulant 114 has recesses to expose a portion of the interconnection element 112. The interconnection element 112 may be a conductive post, conductive pillar, or solder ball.

In some embodiments, an antenna (not shown in FIG. 1) may be integrated with the active component 111 in the control module 11. In some embodiments, the antenna may be disposed adjacent to a top surface of the encapsulant 114. The antenna may be disposed adjacent to the top surface 10t of the substrate 10. The antenna may be disposed adjacent to active component 111. The antenna is electrically connected to the active component 111. The antenna may operate in a frequency band around 2 GHz to around 2.4 GHz. The antenna may communicate wirelessly with a device external to the wearable device. The device may be a mobile/cellular or satellite phone or a tablet, portable, or desktop computer.

The detecting module 12 is disposed on the top surface 10t of the substrate 10. The detecting module 12 is disposed on the top surface of the encapsulant 114 of the control module 11. The gesture-detecting module 12 includes an active component 121, an interconnection element 122, an antenna 123, an encapsulant 124, a carrier 125, and a patterned conductive layer 126.

The carrier 125 may be a substrate. The carrier 125 includes a top surface facing away from the substrate 10 and a bottom surface opposite thereto. The carrier 125 may include interconnection structures (e.g., RDL) disposed therein to provide signal transmission paths between the top surface and the bottom surface of the carrier 125. For example, the active component 121 and the antenna 123 can be electrically connected through the carrier 125. The patterned conductive layer 126 is adjacent to the bottom surface of the carrier 125. The patterned conductive layer 126 may include conductive pads and conductive traces. In some embodiments, the structure or material of the carrier 125 may be similar to the substrate 10. In some embodiments, the carrier 125 is smaller than the substrate 10.

The interconnection element 122 is disposed on the bottom surface of the carrier 125. The interconnection element 122 may include a conductive post, conductive pillar, or solder ball. The interconnection element 122 is electrically connected with the interconnection element 112. For example, the signal transmission path between the detecting module 12 and the control module 11 may be achieved through the interconnections 112 and 122. The interconnection element 122 may be in contact with the interconnection element 112. The interconnection element 112 and the interconnection element 122 may be configured to transmit digital or RF signals.

The encapsulant 124 is disposed on the bottom surface of the carrier 125 and encapsulates the active component 121 and a portion of the interconnection element 122. In some embodiments, the encapsulants 124 and 114 may include the same material. Alternatively, the encapsulants 124 and 114 may include different materials.

The antenna 123 is disposed on or adjacent to the top surface of the carrier 125. The antenna 123 may include a plurality of antenna units 123p. In operation, at least one of the antenna units 123p may be configured to radiate an electromagnetic wave toward an object. Said antenna unit or other antenna unit(s) may be configured to receive one or more electromagnetic waves reflected from the object. The antenna 123 is electrically connected to the active component 121 and configured to transmit the received electromagnetic waves to the active component 121. In some embodiments, the antenna 123 may operate in a frequency band higher than the frequency band of the antenna of the control module 11. In some embodiments, the antenna 123 may operate in a frequency band from about 60 GHz to about 64 GHz.

The active component 121 is disposed above the top surface 10t of the substrate 10. The active component 121 is disposed on the bottom surface of the carrier 125. In other embodiments, the active component 121 may be disposed on the top surface 10t of the substrate 10 and in electrical contact with the patterned conductive layer 103. The control module 11 may be electrically connected to the detecting module 12 through the substrate 10. The active component 121 may include one or more of a controller, processor, digital signal processor (DSP), application-specific integrated circuit (ASIC), or other component or semiconductor device. The active component 121 may be a radar controller or gesture/motion-detecting controller.

The active component 121 is configured to receive the signal (e.g., electromagnetic waves reflected from the object) from the antenna 123 and to generate signals in response thereto. For example, the active component 121 may be configured to generate the signal representing a gesture or a movement (e.g., nodding or shaking head) based on the electromagnetic waves reflected from the object. In some embodiments, the active component 121 may be configured to transmit the signal to the active component 111 to control the wearable device. In some embodiments, the active component 121 may be configured to control the antenna 123. For example, the active component 121 may be configured to control a radiation direction, phase, frequency, or power of electromagnetic waves emitted by the antenna 123.

In some embodiments, the active component 111 and the antenna of the control module 11 are discrete components, and they are integrated into the control module 11. For example, the active component 111, the antenna, and the passive component 117 may be integrated as a system in package (SiP). The active component 121 and the antenna 123 are discrete components. The active component 121 and the antenna 123 are integrated into the detecting module 12. For example, the active component 121 and the antenna 123 may be integrated as another SiP.

In some comparative embodiments, operations (e.g., receiving a call, rejecting a call, volume or microphone control, touch panel switching, proximity sensor reception, noise reduction, external device boot, shutdown, and so on) of a wearable device may be activated by a user through a physical button or a touch panel. However, said physical button or touch panel may occupy a space of the wearable device, which would hinder the miniaturization of the wearable device. In accordance with the embodiments as shown in FIG. 1, the control module 11 (which may be in form of SiP) is integrated with the detecting module 12 (which may be in form of SiP), in which the detecting module 12 may be configured to detect or sense the gesture or motion of a user and the control module 11 may be configured to control the operations of the wearable device based on the detected gesture or motion of the user. This can increase the space for the wearable device or reduce the size of the wearable device. In addition, since the relative locations of the control module 11 and the detecting module 12 can be adjusted depending on different design requirements, it is more flexible to design the wearable device. Also, with the reduction of physical button or touch panel, the control module 11 and the gesture-detecting module 12 disposed on the same substrate 10 may reduce power consumption of a touch panel integrated into the wearable device. Without using a physical button or touch panel, the direct communication between the control module 11 and the detecting module 12 may decrease power consumption of the wearable device.

Figure 2:
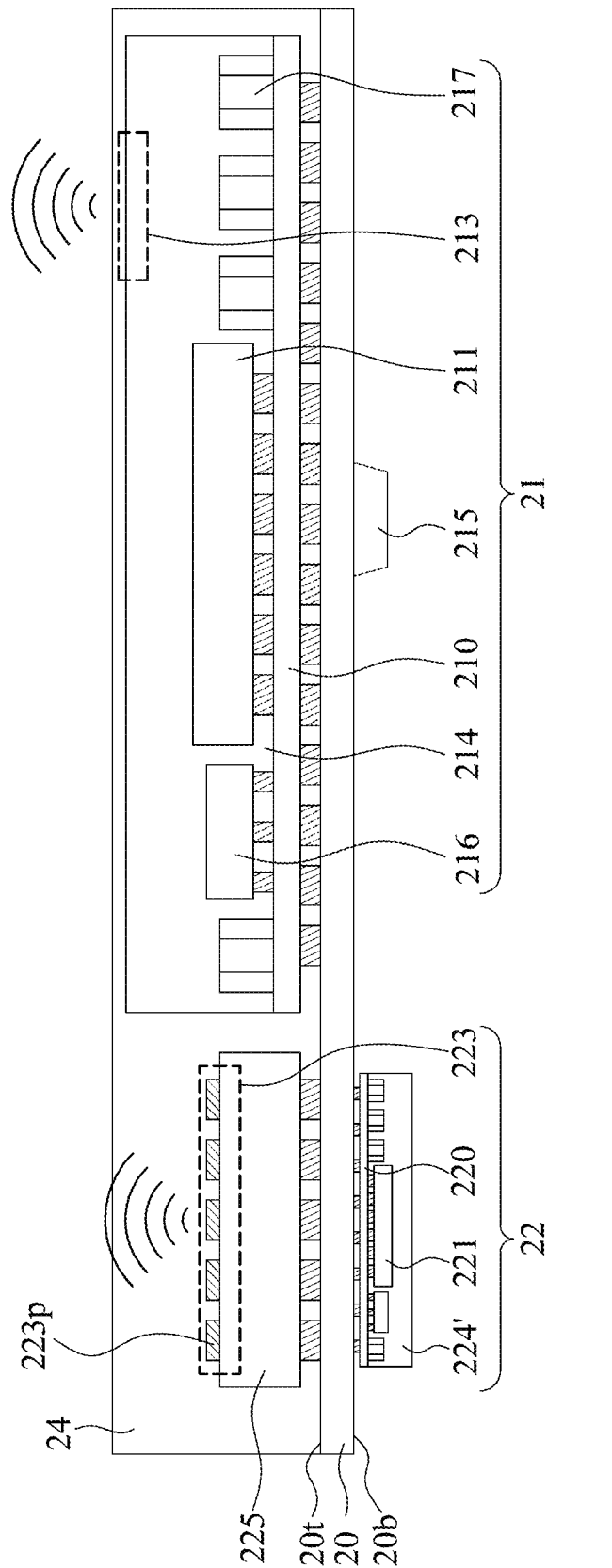
FIG. 2 is a cross-section of a semiconductor device package according to some embodiments of the present disclosure.

FIG. 2 is a cross-section of a semiconductor device package 2 in accordance with some embodiments of the present disclosure. The semiconductor device package 2 includes a substrate 20, a control module 21, a detecting/antenna module 22, and an encapsulant 224. The semiconductor device package 2 may be included in a wearable device.

The substrate 20 includes a top surface 20t and a bottom surface 20b opposite the top surface 20t. The substrate 20 may include patterned conductive layers adjacent to the top surface 20t and the bottom surface 20b, respectively. In some embodiments, the structure or material of the substrate 20 may be similar to the substrate 10.

The control module 21 is electrically connected with the detecting module 22 through the substrate 20. The control module 21 is disposed on the top surface 20t of the substrate 20. The control module 21 includes a carrier 210, an active component 211, an antenna 213, an encapsulant 214, a sensor device 215, an active component 216, and a passive component 217. The carrier 210, the active component 211, the antenna 213, and the passive component 217 are disposed on the top surface 20t of the substrate 20. The active component 211, the antenna 213, the encapsulant 214, and the passive component 217 are disposed on the carrier 210.

The control module 21 is configured to receive a signal from the detecting module 22 and to control the wearable device according thereto. The active component 211 of the control module 21 may be configured to receive or transmit signals. The control module 21 may be configured to receive different signals from the detecting module 22 and control the wearable device according thereto. The operations of the wearable device may correspond to respective signals. The operations of the wearable device are similar to those described in FIG. 1. The control module 21 may be configured to send commands including playback and control of an external device storing music or other media.

The carrier 210 is in contact with the patterned conductive layer adjacent to the top surface 20$t$ of the substrate 20. A structure or material of the carrier 210 may be similar to the structure or material of the substrate 20 or the carrier 125. In some embodiments, the carrier 210 may be omitted.

The sensor device 215 is disposed on the bottom surface 20$b$ of the substrate 20. The sensor device 215 is integrated into the control module 21. The sensor device 215 may enhance the sensing function of the control module 21.

The active component 211 may include one or more of a controller, processor, digital signal processor (DSP), application-specific integrated circuit (ASIC), or other component or semiconductor device. The active component 211 may be a wearable device controller. The active component 211 may control electronic components, such as an antenna, Bluetooth module, speaker, or microphone. A structure or functions, operations of the active component 211 may be similar to those of the active component 111.

The passive component 217 may be a resistor, capacitor, inductor, or combination thereof. The passive component 217 is integrated into the control module 21. The carrier 210, the active component 211, the antenna 213, the active component 216, and the passive component 217 are encapsulated by the encapsulant 214.

The active component 216 is disposed on the carrier 210. The active component 216 may include one or more of a controller, processor, digital signal processor (DSP), application-specific integrated circuit (ASIC), or other component or semiconductor device. The active component 216 is electrically connected to the active component 211 and the antenna 213. A structure of the active component 216 may be similar to the structure of the active component 211. In some embodiments, the active component 211 and the active component 216 may be dual controllers or processors. The control module 21 may implement more functions through the active component 211 and the active component 216.

The antenna 213 is disposed on or adjacent to a top surface of the encapsulant 214 which faces away from the substrate 20. The antenna 213 is integrated into the control module 21. The antenna 213 is electrically connected to the active component 211. The antenna 213 may operate in a frequency band around 2 GHz to around 2.4 GHz. The antenna 213 may communicate wirelessly with a device external to the wearable device. The device may be a mobile/cellular or satellite phone, or a tablet, portable, or desktop computer.

The encapsulant 24 is disposed on the top surface 20$t$ of the substrate 20 and encapsulates the control module 21.

The detecting module 22 includes a carrier 220, an active component 221, an antenna 223, an encapsulant 224', and a carrier 225. In some embodiments, the detecting module 22 may include a sub-module disposed on the bottom surface 20$b$ of the substrate 20 and a sub-module disposed on the top surface 20$t$ of the substrate 20.

The carrier 225 is disposed on the top surface 20$t$ of the substrate 20 and in contact with the patterned conductive layer of the substrate 20. A structure or material of the carrier 225 may be similar to the structure or material of the carrier 210. The carrier 225 is smaller than the carrier 210. In some embodiments, the carrier 225 may be omitted.

The antenna 223 is disposed adjacent to a top surface of the carrier 225 which faces away from the substrate 20. The antenna 223 includes a plurality of antenna units 223$p$. In operation, at least one of the antenna units 223$p$ may be configured to radiate an electromagnetic wave toward an object. Said antenna unit or other antenna unit(s) may be configured to receive one or more electromagnetic waves reflected from the object. The antenna 223 is electrically connected to the active component 221 and configured to transmit the received electromagnetic waves to the active component 221. In some embodiments, the antenna 223 may operate in a frequency band higher than the frequency band of the antenna 213 of the control module 21. In some embodiments, the antenna 223 may operate in a frequency band from about 60 GHz to about 64 GHz The carrier 220 is in contact with the patterned conductive layer adjacent to the bottom surface 20$b$ of the substrate 20. A structure or material of the carrier 220 may be similar to the structure or material of the carrier 210. The carrier 220 is smaller than the carrier 225. In some embodiments, the carrier 220 may be omitted.

The active component 221 is disposed on the bottom surface 20$b$ of the substrate 20. The active component 221 is disposed on a bottom surface of the carrier 220 which faces away from the substrate 20. The active component 221 may include one or more of a controller, processor, digital signal processor (DSP), application-specific integrated circuit (ASIC), or other component or semiconductor device. The active component 221 may be a radar controller or a gesture/motion-detecting controller.

The active component 221 is configured to receive the signal (e.g., electromagnetic waves reflected from the object) from the antenna 223 and to generate signals in response thereto. For example, the active component 221 may be configured to generate the signal representing a gesture or a movement (e.g., nodding or shaking head) based on the electromagnetic waves reflected from the object. In some embodiments, the active component 221 may be configured to transmit the signal to the active component 211 to control the wearable device.

In some embodiments, the active component 221 may be configured to control the antenna 223. For example, the active component 221 may be configured to control a radiation direction, phase, frequency, or power of electromagnetic waves emitted by the antenna 223.

In some embodiments, the arrangements of the active component 221 and the antenna 223 may be switched. The active component 211, the antenna 213, and the active component 216 are discrete components, and they are integrated into the control module 21. For example, the active component 211, the antenna 213, the active component 216, and the passive component 217 may be integrated as a system in package (SiP). The active component 221 and the antenna 223 are integrated into the detecting module 22. The active component 221 and the antenna 223 are discrete components. For example, the active component 221 and the antenna 223 may be integrated as another SiP.

In some embodiments, the functions or operations of the control module 21 and the detecting module 22 are similar to those of the control module 11 and the detecting module 12.

Figure 3:
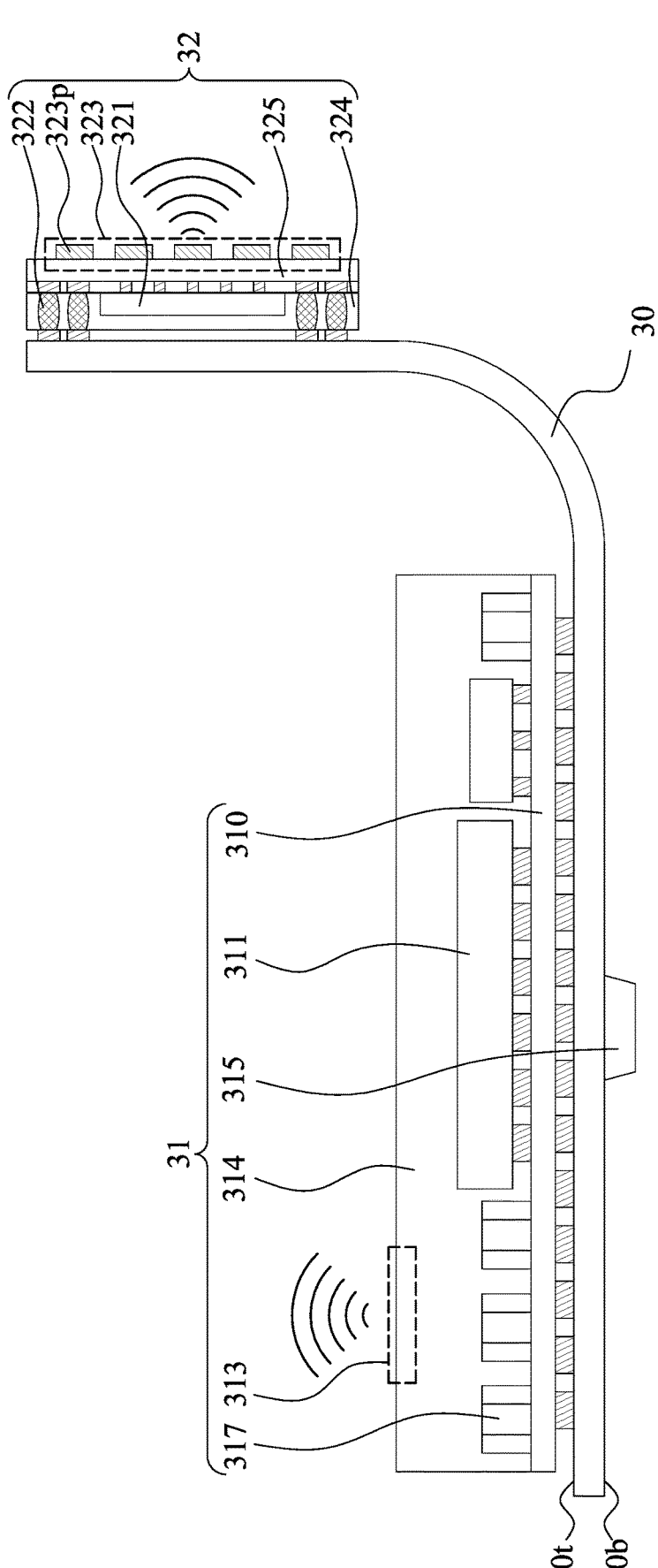
FIG. 3 is a cross-section of a semiconductor device package according to some embodiments of the present disclosure.

FIG. 3 is a cross-section of a semiconductor device package 3 in accordance with some embodiments of the present disclosure. The semiconductor device package 3 includes a substrate 30, a control module 31, and a detecting/antenna module 32. The semiconductor device package 3 may be included in a wearable device.

The substrate 30 includes a top surface 30$t$ and a bottom surface 30$b$ opposite thereto. The substrate 30 may include patterned conductive layers adjacent to the top surface 30$t$ and the bottom surface 30$b$, respectively. The substrate 30 is configured to be bendable, foldable, or twistable to adjust a respective location of the control module 31 and the gesture-detecting module 32 so as to flexibly control an orientation or signal radiation direction of the antennas in the control module 31 and the detecting module 32. In some embodiments, the substrate 30 may include an interconnection structure, such as a redistribution layer (RDL) or a grounding element. The substrate 30 may include dielectric layers and conductive layers. The substrate 30 may include a conductive pad or a conducive trace. The substrate 30 may include a flexible print circuit (FPC) board for transmitting digital signals within a frequency band around 2 GHz to around 2.4 GHz.

The control module 31 is electrically connected to the detecting module 32 through the substrate 30. The control module 31 is in contact with the patterned conductive layer adjacent to the top surface 30*t* of the substrate 30. The control module 31 includes a carrier 310, an active component 311, an antenna 313, an encapsulant 314, a sensor device 315, and a passive component 317. A structure or functions, operations of the control module 31 may be similar to those of the control module 21.

The detecting module 32 is disposed on the bottom surface 30*b* of the substrate 30. The detecting module 32 is in contact with the patterned conductive layer adjacent to the bottom surface 30*b* of the substrate 30. The detecting module 32 includes an active component 321, an interconnection element 322, an antenna 323, an encapsulant 324, and a carrier 325. The antenna 323 includes antenna units 323*p*. A structure or functions, operations of the detecting module 32 may be similar to those of the detecting module 12.

In some embodiments, the active component 311 and the antenna 313 are discrete components, and they are integrated into the control module 31. For example, the active component 311, the antenna 313 may be integrated as a system in package (SiP). The active component 321 and the antenna 323 are discrete components and they are integrated into the detecting module 32. For example, the active component 121 and the antenna 123 may be integrated as another SiP.

Figure 4:
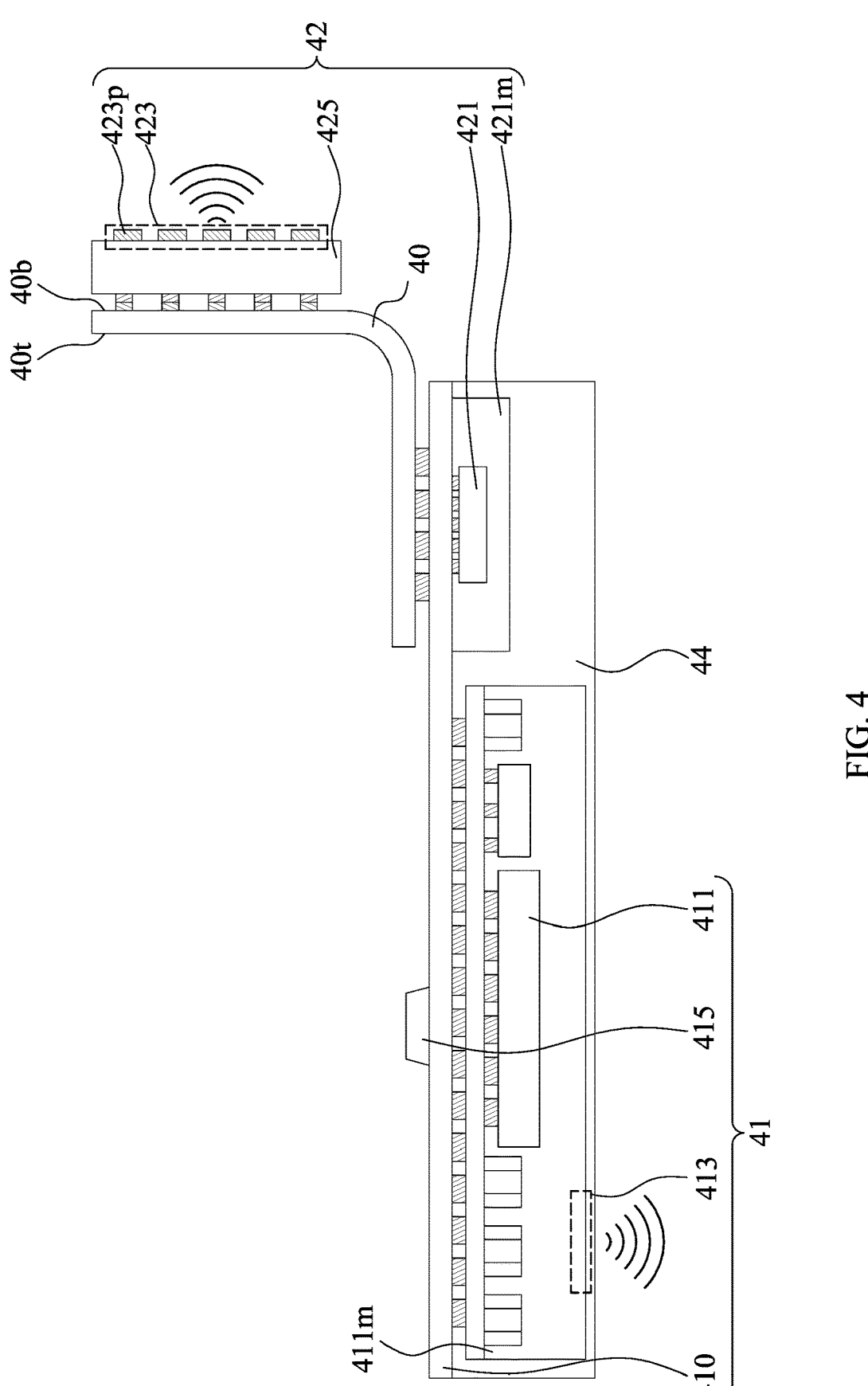
FIG. 4 is a cross-section of a semiconductor device package according to some embodiments of the present disclosure.

FIG. 4 is a cross-section of a semiconductor device package 4 in accordance with some embodiments of the present disclosure. The semiconductor device package 4 includes a substrate 40, a control module 41, a detecting/antenna module 42, and an encapsulant 44. The semiconductor device package 4 may be included in a wearable device.

The substrate 40 includes a top surface 40*t* and a bottom surface 40*b* opposite the top surface 40*t*. The substrate 40 may include patterned conductive layers adjacent to the top surface 40*t* and the bottom surface 40*b*, respectively. The substrate 40 is configured to be bendable, foldable, or twistable to adjust a respective location of the control module 41 and the detecting module 42 so as to flexibly control an orientation or signal radiation direction of the antennas in the control module 41 and the detecting module 42. In some embodiments, the substrate 40 may include an interconnection structure, such as a redistribution layer (RDL) or a grounding element. The substrate 40 may include dielectric layers and conductive layers. The substrate 40 may include a core layer as a rigid body. The substrate 40 may include a conductive pad or a conducive trace. The substrate 40 may include a high frequency circuit board for transmitting signals within a high frequency band (e.g., from around 60 GHz to around 64 GHz). The substrate 40 may include a liquid crystal polymer. The substrate 40 may reduce power loss.

The control module 41 is electrically connected with the detecting module 42 through the substrate 40. The control module 41 is in contact with the patterned conductive layer adjacent to the bottom surface 40*b* of the substrate 40. The control module 41 includes a carrier 410, an active component 411, an encapsulant 411*m*, an antenna 413, and a sensor device 415. The active component 411 is encapsulated by the encapsulant 411*m*. The active component 416 is encapsulated by the encapsulant 416*m*. Structure, function, or operation of the control module 41 may be similar to that in the control module 21. In some embodiments, the active component 416 may be integrated into a sub-module of the control module 41.

The control module 41 extends over the substrate 40. In some embodiments, the control module 41 is disposed on the bottom surface 40*b* of the substrate 40 without extending over the substrate 40.

The detecting module 42 is disposed on the bottom surface 40*b* of the substrate 40. The detecting module 42 is in contact with the patterned conductive layer adjacent to the bottom surface 40*b* of the substrate 40. The detecting module 42 includes an active component 421, an encapsulant 421*m*, an antenna 423, and a carrier 425. The active component 421 is disposed above the substrate 40. The active component 421 is disposed on the carrier 410. The active component 421 is encapsulated by the encapsulant 421*m*. The active component 421 is electrically connected to the antenna 423 through the substrate 40. The antenna 423 includes antenna units 423*p*. Structure, function, or operation of the detecting module 42 may be similar to that in the detecting module 32. In some embodiments, the active component 421 may be integrated into a sub-module of the detecting module 42. The antenna 423 may be integrated into a sub-module of the detecting module 42.

The active component 411, the encapsulant 411*m*, the active component 421, and the encapsulant 421*m* are encapsulated by the encapsulant 44.

In some embodiments, the active component 411 and the antenna 413 are discrete components, and they are integrated into the control module 41. For example, the active component 411 and the antenna 413 may be integrated as a system in package (SiP). The active component 421 and the antenna 423 are integrated into the detecting module 42. For example, the active component 421 and the antenna 423 may be integrated as another SiP.

Figure 5:
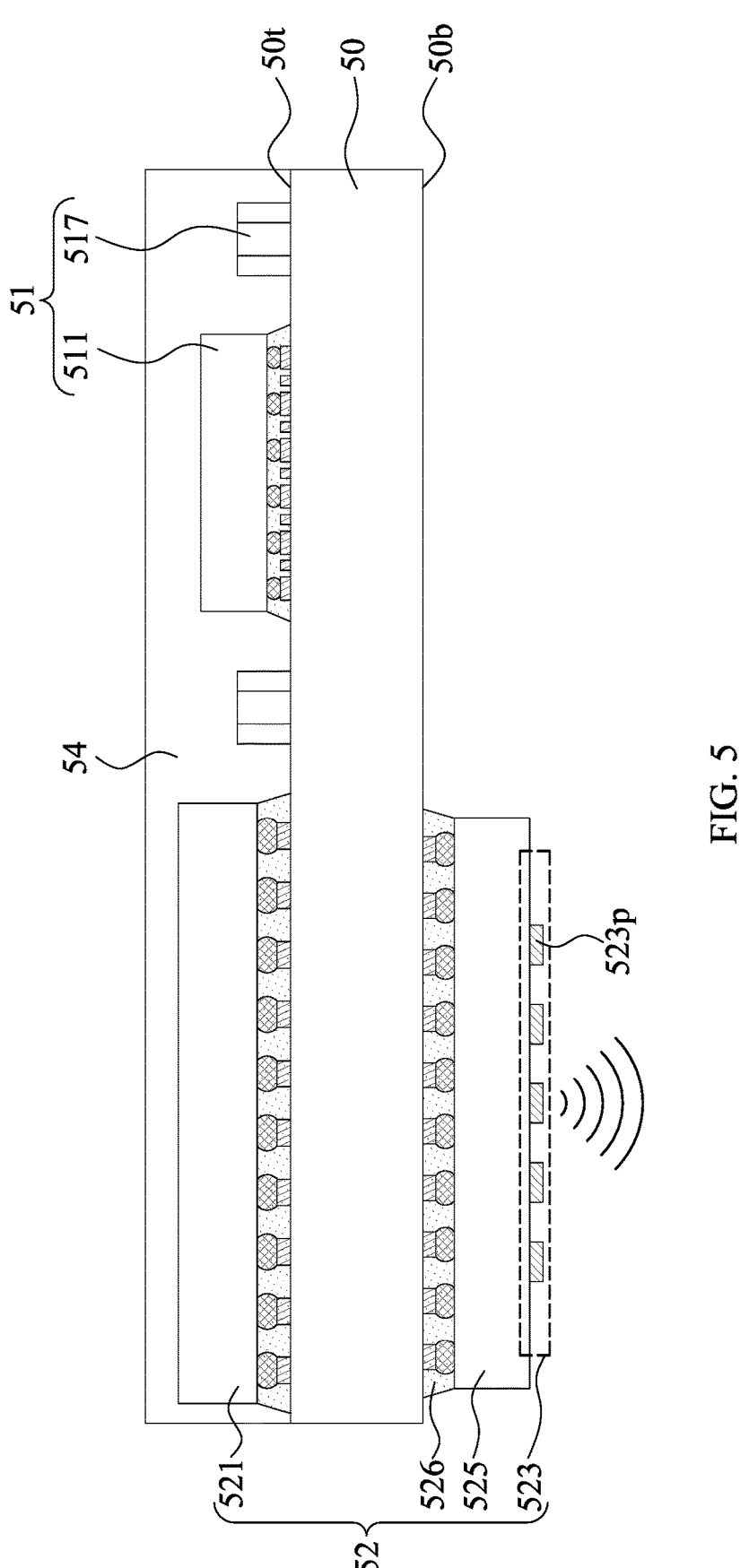
FIG. 5 is a cross-section of a semiconductor device package according to some embodiments of the present disclosure.

FIG. 5 is a cross-section of a semiconductor device package 5 in accordance with some embodiments of the present disclosure. The semiconductor device package 5 includes a substrate 50, a control module 51, a detecting/antenna module 52, and encapsulant 54. The encapsulant 54 encapsulates the control module 51 and the detecting module 52. The semiconductor device package 5 may be included in a wearable device.

The substrate 50 includes a top surface 50*t* and a bottom surface 50*b* opposite the top surface 50*t*. A structure and material of the substrate 50 may be similar to those of the substrate 10.

The control module 51 is electrically connected with the detecting module 52 through the substrate 50. The control module 51 is disposed on the top surface 50*t* of the substrate 50. The control module 51 includes an active component 511 and a passive component 517.

The active component 511 may include one or more of a controller, processor, digital signal processor (DSP), application-specific integrated circuit (ASIC), or other component or semiconductor device. The active component 511 may be a wearable device controller. The active component 511 may control electronic components, such as an antenna, Bluetooth module, speaker, or microphone according to transmitted signals. The passive component 517 may be a resistor, a capacitor, an inductor, or a combination thereof. The active component 511 and the passive component 517 are integrated into the control module 51.

The control module 51 may include an antenna (not shown in FIG. 5). Similar to FIG. 1, the antenna may be integrated or arranged with the active component 511 in the control module 51. The functions and operations of the control module 51 are similar to those of the control module 11.

The detecting module 52 includes an active component 521, an antenna 523, a substrate 525, and an active component 526. The antenna 523 includes antenna units 523p. In some embodiments, the detecting module 52 may include a sub-module disposed on the bottom surface 50b of the substrate 50 and a sub-module disposed on the top surface 50t of the substrate 50. The functions and operations of the detecting module 52 are similar to those of the detecting module 22. The active component 526 may be omitted.

In some embodiments, the active component 511 and the antenna of the control module 51 are integrated into the control module 51. For example, the active component 511, the antenna of the control module 51, and the passive component 517 may be integrated as a system in package (SiP). The active component 521 and the antenna 523 are integrated into the detecting module 52. The active component 526 and the antenna 523 are integrated into the detecting module 52. For example, the active component 521 and the antenna 523 may be integrated as another SiP.

Figure 6:
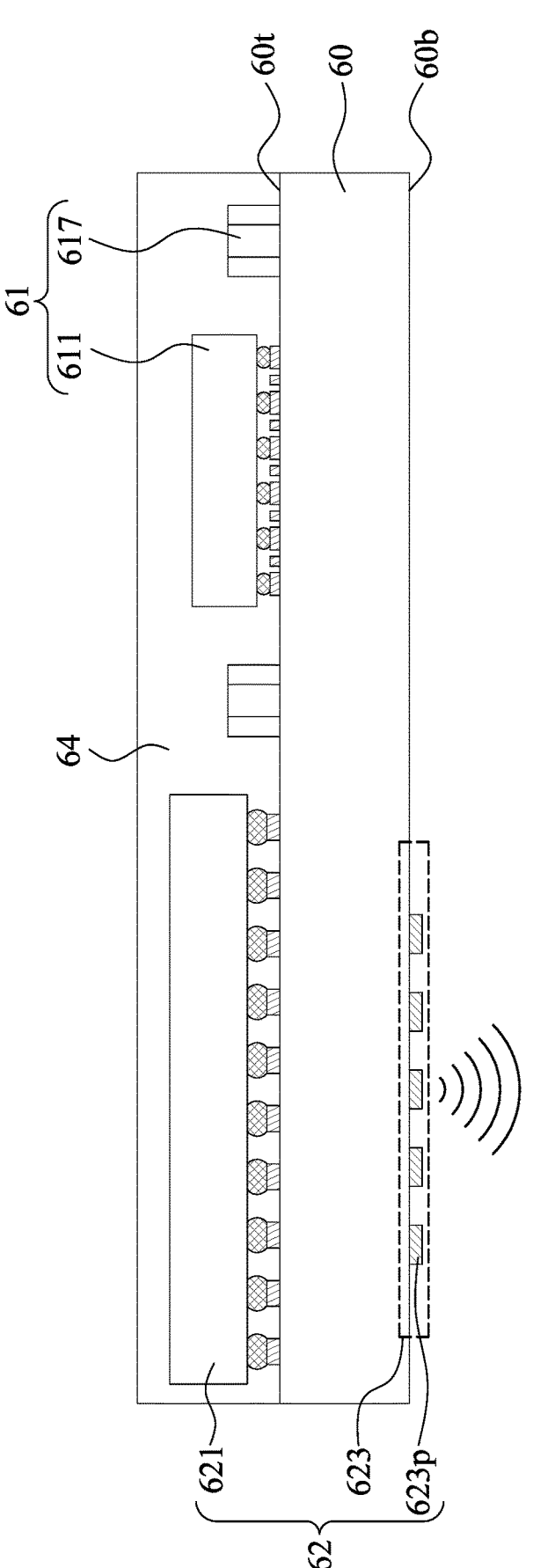
FIG. 6 is a cross-section of a semiconductor device package according to some embodiments of the present disclosure.

FIG. 6 is a cross-section of a semiconductor device package 6 in accordance with some embodiments of the present disclosure. The semiconductor device package 6 includes a substrate 60, a control module 61, a detecting/antenna module 62, and encapsulant 64. The semiconductor device package 6 is similar to the semiconductor device package 5 in FIG. 5 except that an antenna 623 is adjacent to a bottom surface 60b of the substrate 60. The active component 621 adjacent to a top surface 60t of the substrate 60 and the antenna 623 adjacent to the bottom surface 60b of the substrate 60 are integrated into the detecting module 62.

The control module 61 includes an active component 611 and a passive component 617. The active component 611 adjacent to the top surface 60t of the substrate 60 and an antenna adjacent to the top surface 60t of the substrate 60 are integrated into a control module 61.

In some embodiments, the substrate 60 may include a low loss material. The substrate 60 may be minimized.

Figure 7:
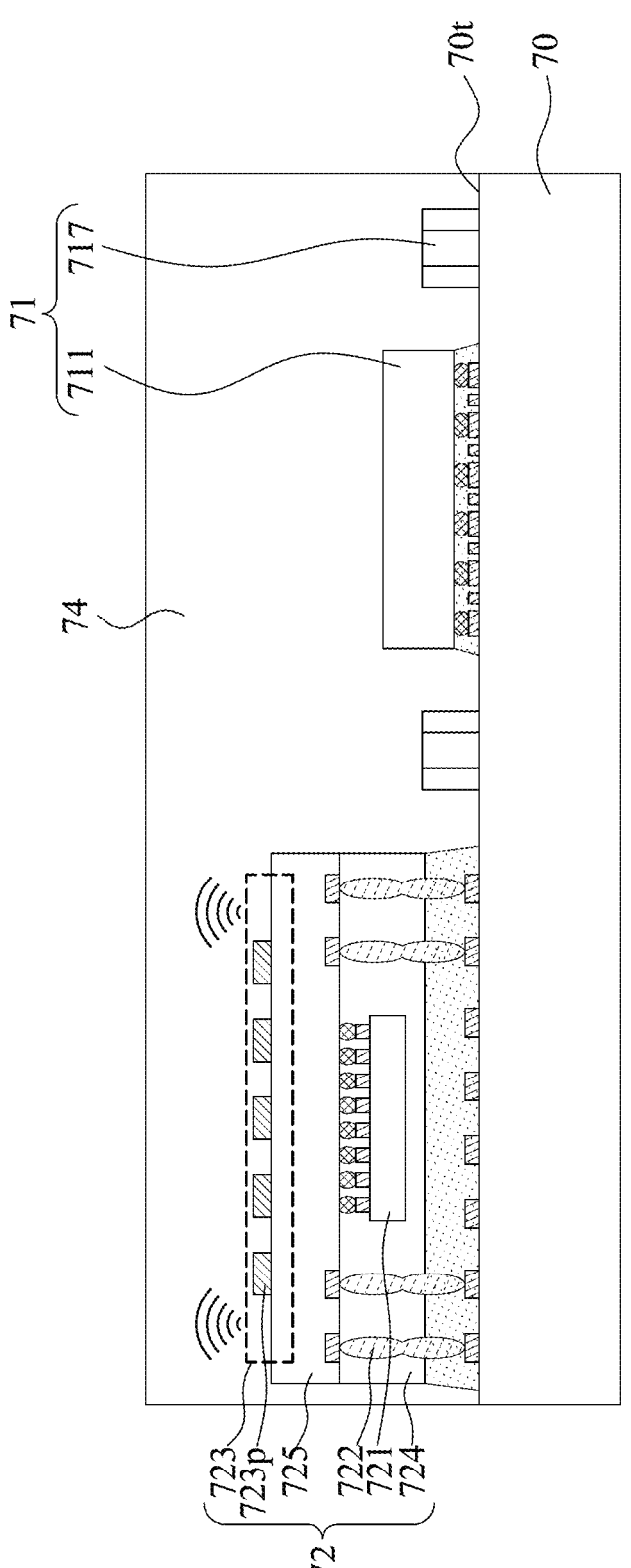
FIG. 7 is a cross-section of a semiconductor device package according to some embodiments of the present disclosure.

FIG. 7 is a cross-section of a semiconductor device package 7 in accordance with some embodiments of the present disclosure. The semiconductor device package 7 includes a substrate 70, a control module 71, a detecting/antenna module 72, and encapsulant 74. The detecting module 72 includes an active component 721, an interconnection element 722, an antenna 723, an encapsulant 724, a carrier 725, and a patterned conductive layer 726. Structure, function, or operation of the detecting module 72 are similar to those of the detecting module 12. In some embodiments, the interconnection element 722 may be further protected by an underfill. The control module 71 includes an active component 711 and a passive component 717. The antenna 723 includes antenna units 723p.

The semiconductor device package 7 is similar to the semiconductor device package 6 in FIG. 6 except that the active component 721 and the antenna 723 are disposed on a top surface 70t of the substrate 70. The active component 721 is adjacent to a bottom surface of the carrier 725. The antenna 723 is disposed on or adjacent to a top surface of the carrier 725.

Under the spirit of the present disclosure, the functions or operations of the elements of control modules and detecting modules of FIG. 1 to FIG. 7 may be applied to one another.

Figure 8:
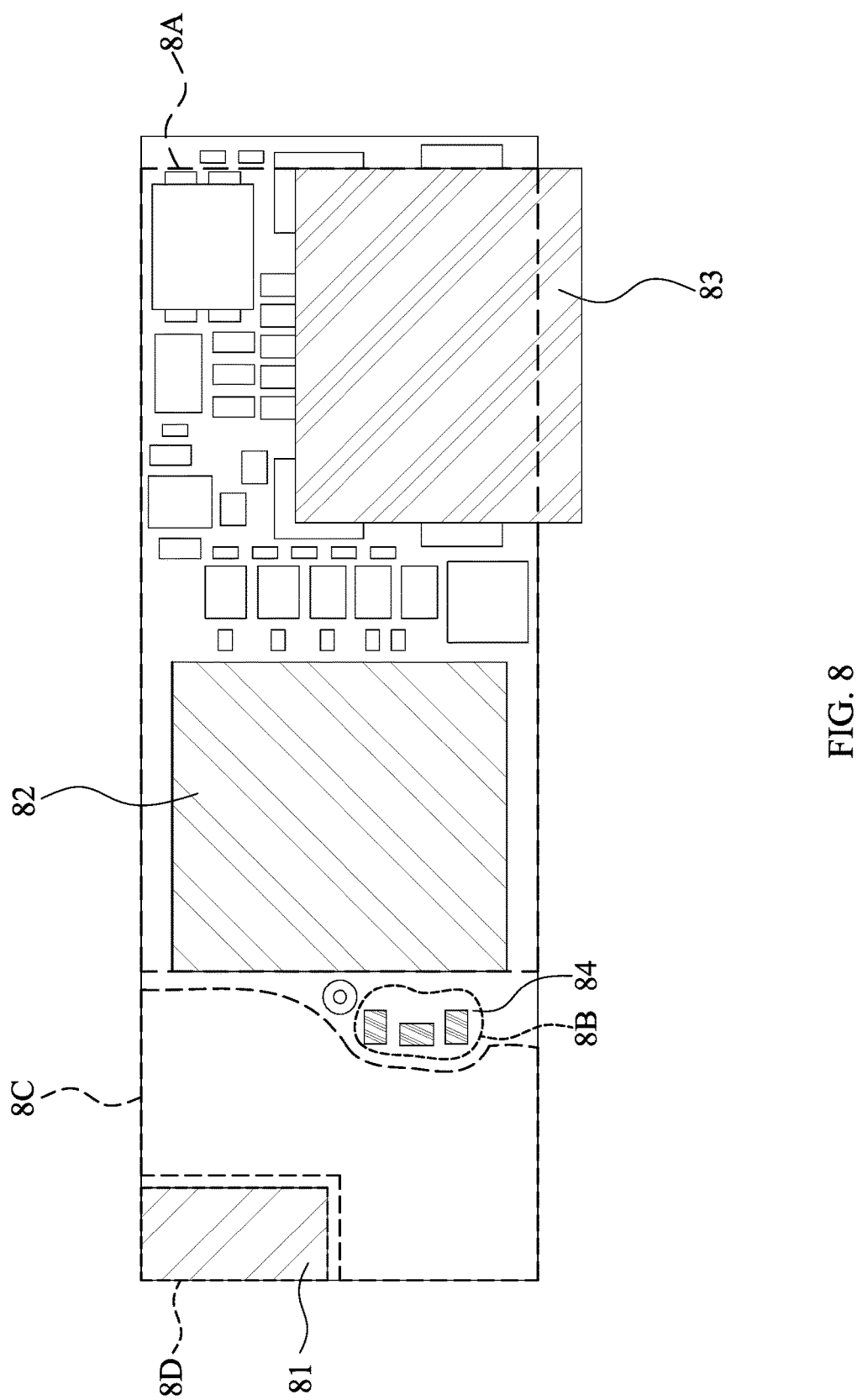
FIG. 8 illustrates a layout of a semiconductor device package according to some embodiments of the present disclosure.

FIG. 8 is a layout of a semiconductor device package 8 according to some embodiments of the present disclosure. The semiconductor device package 8 includes a detecting module configurable zone 8A, a circuit configurable zone 8B, a clearance zone 8C, and a control module configurable zone 8D. The detecting module configurable zone 8A and the control module configurable zone 8D are spaced by the clearance zone 8C. The circuit configurable zone 8B and the control module configurable zone 8D are spaced from each other by the clearance zone 8C. The clearance zone 8C is free from electrically conductive elements. A radio hole is disposed among the detecting module configurable zone 8A, the circuit configurable zone 8B, and the clearance zone 8C.

In some embodiments, a detecting module 82 may be disposed in the detecting module configurable zone 8A. The detecting module 82 may be disposed adjacent to a center of a substrate. A connector 83 may be disposed in the detecting module configurable zone 8A. A detection circuit or a recognition circuit may be disposed in the detecting module configurable zone 8A. A matching circuit 84 may be disposed in the circuit configurable zone 8B. The matching circuit 84 may be a Bluetooth module matching circuit. A control module 81 may be disposed in the control module configurable zone 8D. A Bluetooth module may be disposed in the control module configurable zone 8D. An antenna circuit may be disposed in the control module configurable zone 8D. The control module 81 may be disposed adjacent to a corner of the substrate.

Figure 9:
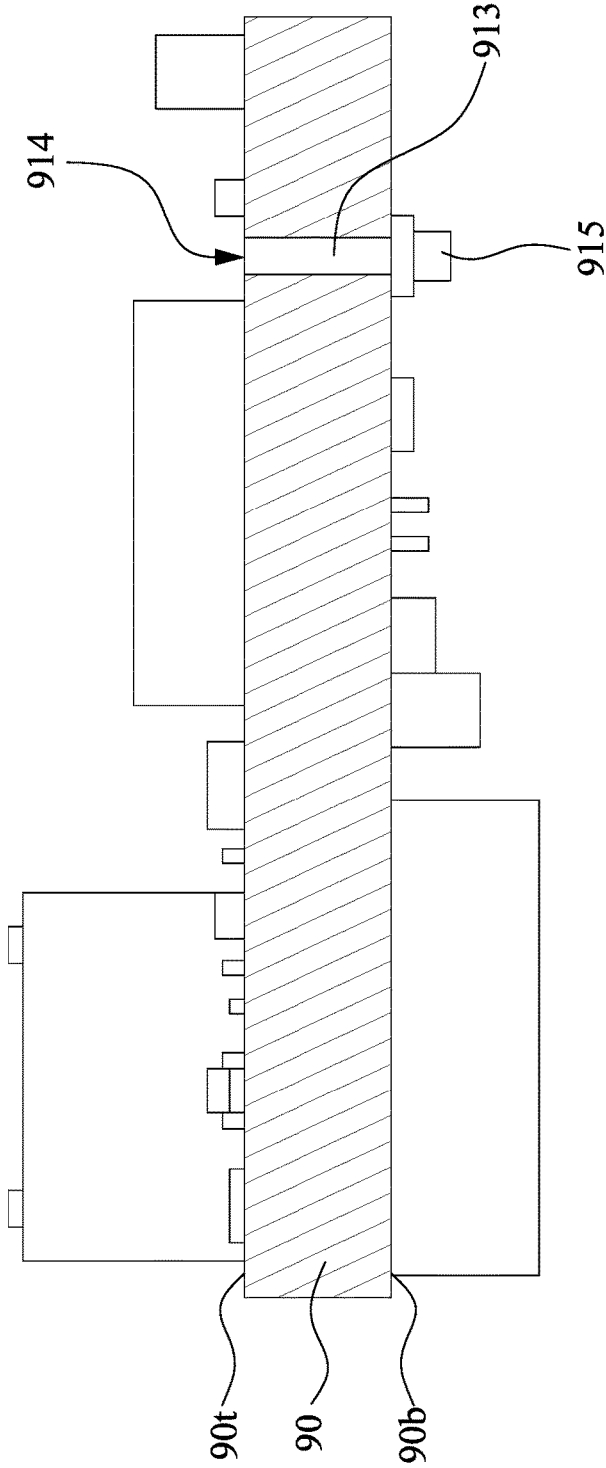
FIG. 9 illustrates a cross-section of a semiconductor device package according to some embodiments of the present disclosure.

FIG. 9 illustrates a cross-section of a semiconductor device package 9 according to some embodiments of the present disclosure. The semiconductor device package 9 includes a substrate 90. The substrate 90 includes a top surface 90t and a bottom surface 90b opposite thereto. The substrate 90 includes a waveguide 913.

A radio hole 914 is disposed on the top surface 90t of the substrate 90. The radio hole 914 is connected to the waveguide 913. A sensor device 915 is disposed on the bottom surface 90b of the substrate 90. The sensor device 915 is connected to the waveguide 913. The sensor device 915 may be a microphone.

In some embodiments, a control module and/or a detecting/antenna module may be disposed on the top surface 90t or the bottom surface 90b of the substrate 90.

Figure 10A:
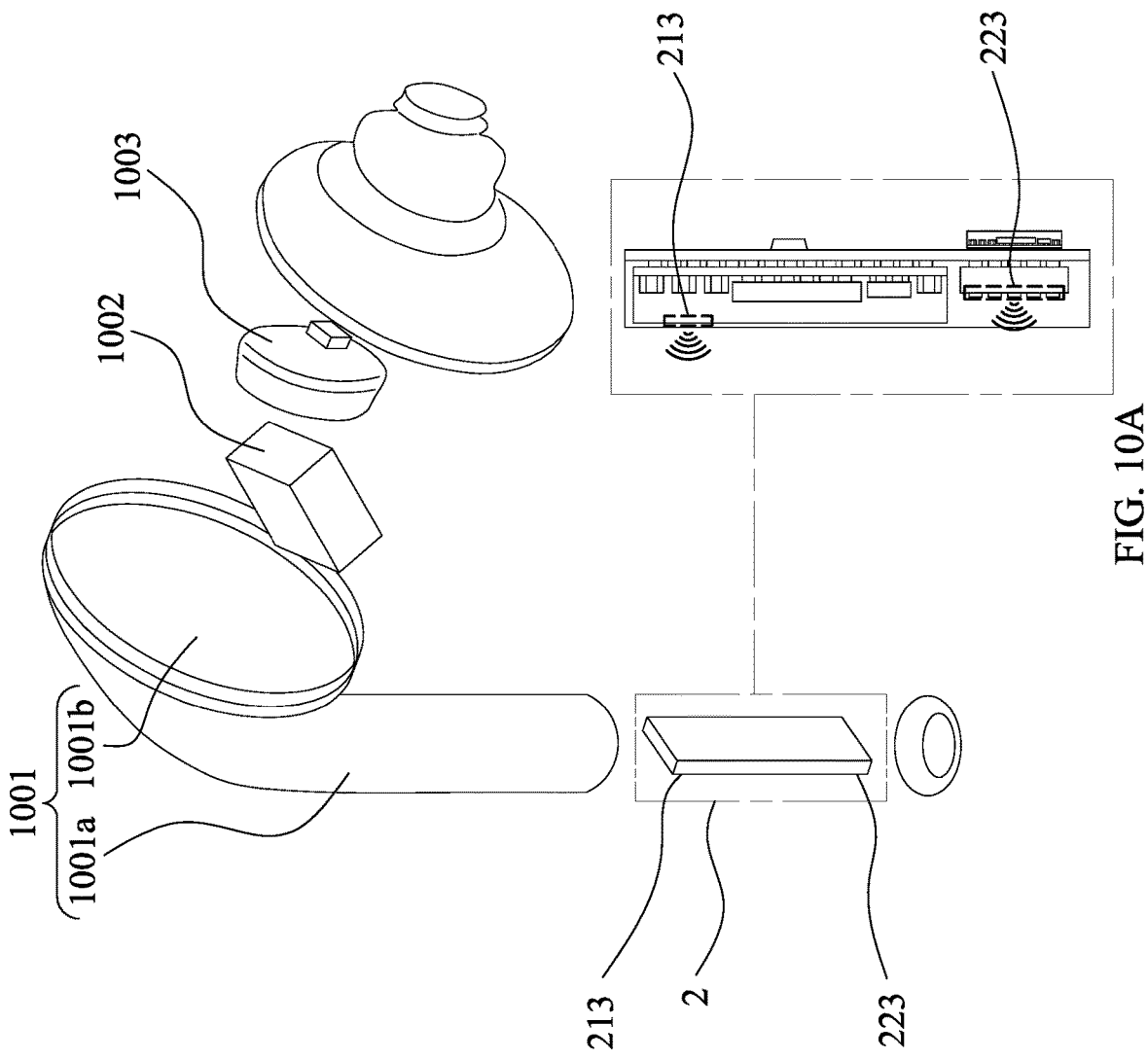
FIG. 10A illustrates a perspective view of an electronic apparatus according to some embodiments of the present disclosure.

FIG. 10A illustrates a perspective view of an electronic apparatus 1000 according to some embodiments of the present disclosure. The electronic apparatus 1000 includes a housing 1001, a battery 1002, speaker 1003, and a semiconductor device package 2. The housing 1001 includes an extension portion 1001a and a main portion 1001b. The battery 1002 and the speaker 1003 are disposed within the main portion 1001b of the housing 1001. In some embodiments, the electronic apparatus 1000 may be a Bluetooth headphone. The electronic apparatus 1000 may be suspended on an object. The electronic apparatus 1000 may be wore by a user.

The semiconductor device package 2 is disposed within the extension portion 1001a. An antenna 213 of the semiconductor device package 2 faces away from the user. An antenna 223 of the semiconductor device package 2 faces away from the user. The antenna 223 may detect a movement of an object (e.g., a hand of the user). A substrate 20 of the semiconductor device package 2 is proximity to the user.

In some embodiments, the semiconductor device package 2 may be replaced by one of the semiconductor device packages of FIG. 1 and FIG. 5 to FIG. 7.

Figure 10B:
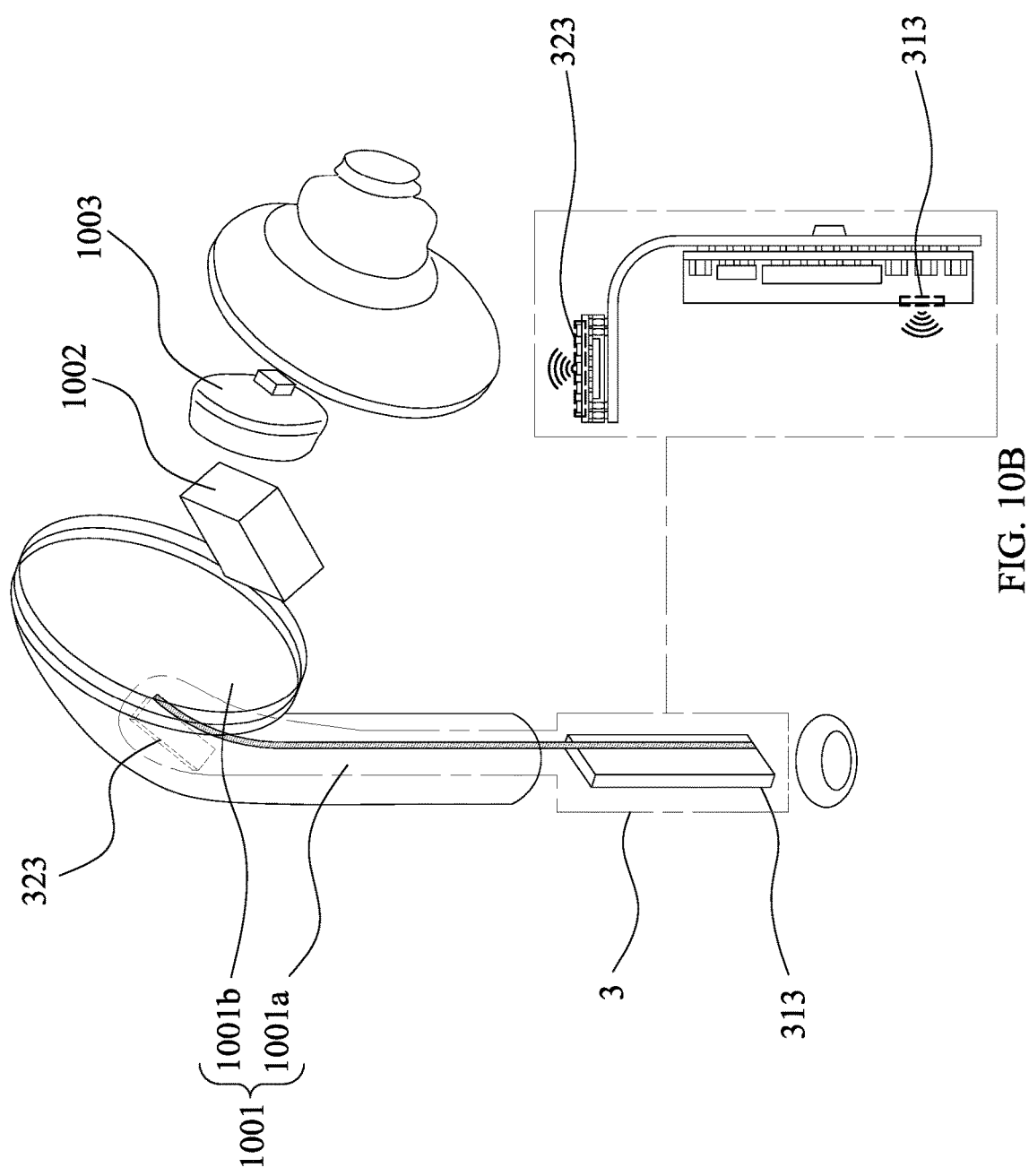
FIG. 10B illustrates a perspective view of an electronic apparatus according to some embodiments of the present disclosure.

FIG. 10B illustrates a perspective view of an electronic apparatus 1000' according to some embodiments of the present disclosure. The electronic apparatus 1000' is similar to the electronic apparatus 1000 in FIG. 10A except that a semiconductor device package 3 is disposed within the extension portion 1001a. An antenna 313 of the semiconductor device package 3 faces away from the user. The antenna 313 is disposed within the extension portion 1001a.

A substrate 30 of the semiconductor device package 3 extends from the extension portion 1001a to the main portion 1001b. An antenna 323 of the semiconductor device package 3 faces away from the user. The antenna 323 is disposed within the main portion 1001b.

In some embodiments, the semiconductor device package 3 may be replaced by one of the semiconductor device package 4 of FIG. 4.

FIG. 11A through FIG. 11D illustrate some embodiments of a method of manufacturing the semiconductor device package 1 according to some embodiments of the present disclosure.

Figure 11A:
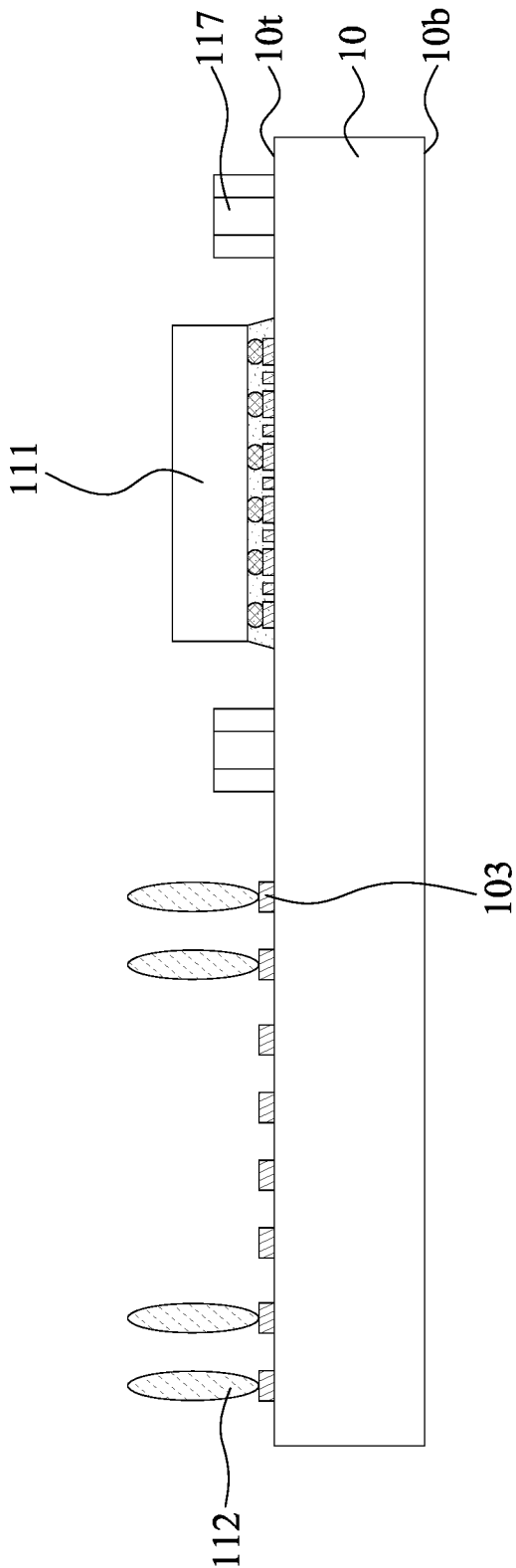
FIG. 11A illustrates a method of manufacturing a semiconductor device package according to some embodiments of the present disclosure.

Referring to FIG. 11A, a method for manufacturing the semiconductor device package 1 includes providing a substrate 10. The substrate 10 includes a top surface 10t and a bottom surface 10b opposite thereto. The substrate 10 includes a patterned conductive layer 103 adjacent to the top surface 10t.

An interconnection element 112 is disposed on the top surface 10t of the substrate 10. The interconnection element 112 is electrically connected to the patterned conductive layer 103. The interconnection element 112 may include a conductive post, conductive pillar, or solder ball. The conductive post or the conductive pillar may be a preformed conductive post or pillar.

An active component 111 is disposed on the top surface 10t of the substrate 10. The active component 111 is electrically connected to the patterned conductive layer 103. The active component 111 may include one or more of a controller, processor, digital signal processor (DSP), application-specific integrated circuit (ASIC), or other component or semiconductor device. The active component 111 may be a wearable device controller. In some embodiments, an underfill may be disposed on an active surface of the active component 111. The underfill is disposed between the active surface of the active component 111 and the top surface 10t of the substrate 10.

In some embodiments, an antenna may be disposed adjacent to the top surface 10t of the substrate 10. The antenna may be disposed adjacent to active component 111. The antenna is electrically connected to the active component 111. The antenna may operate in a frequency band around 2 GHz to around 2.4 GHz. The antenna and the active component 111 may be integrated into a control module 11.

A passive component 117 is disposed on the top surface 10t of the substrate 10. The passive component 117 is electrically connected to the patterned conductive layer 103. The passive component 117 may be a resistor, a capacitor, an inductor, or a combination thereof.

Figure 11B:
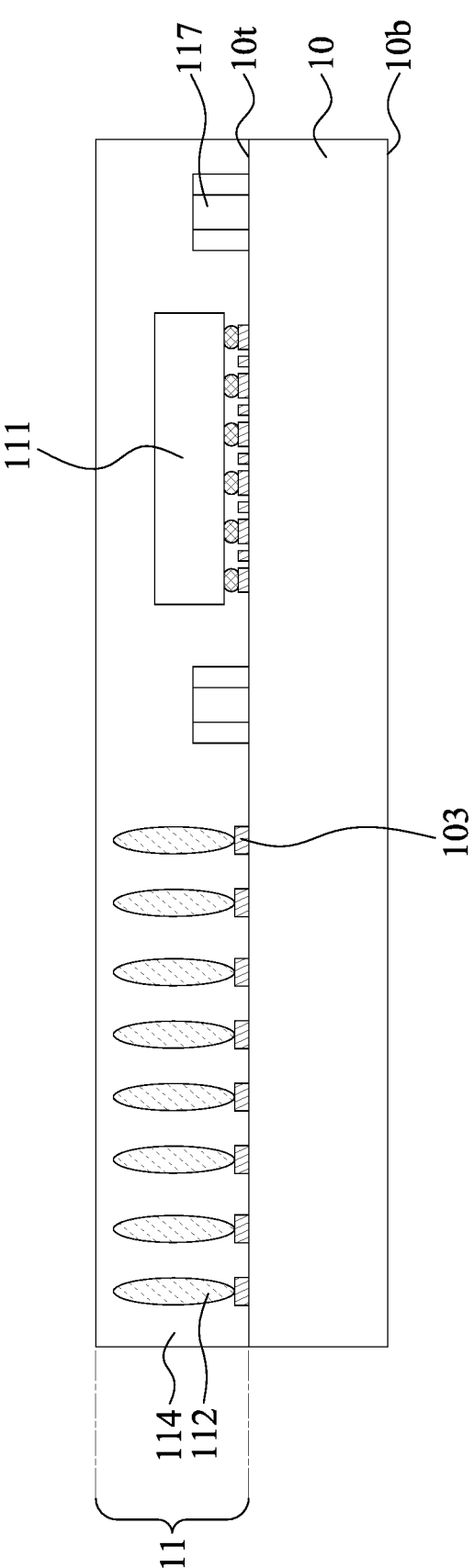
FIG. 11B illustrates a method of manufacturing a semiconductor device package according to some embodiments of the present disclosure.

Referring to FIG. 11B, an encapsulant 114 is disposed on the top surface 10t of the substrate 10 during a molding operation. The encapsulant 114 encapsulates the active component 111, the interconnection element 112, and the passive component 117. Subsequently, the encapsulant 114 is grinded during a removal operation. The removal operation utilizes grinding. A thickness of the encapsulant 114 may be adjusted by the removal operation.

In some embodiments, the antenna may be disposed adjacent to a top surface of the encapsulant 114. The antenna and the active component 111 may be integrated into the control module 11.

Figure 11C:
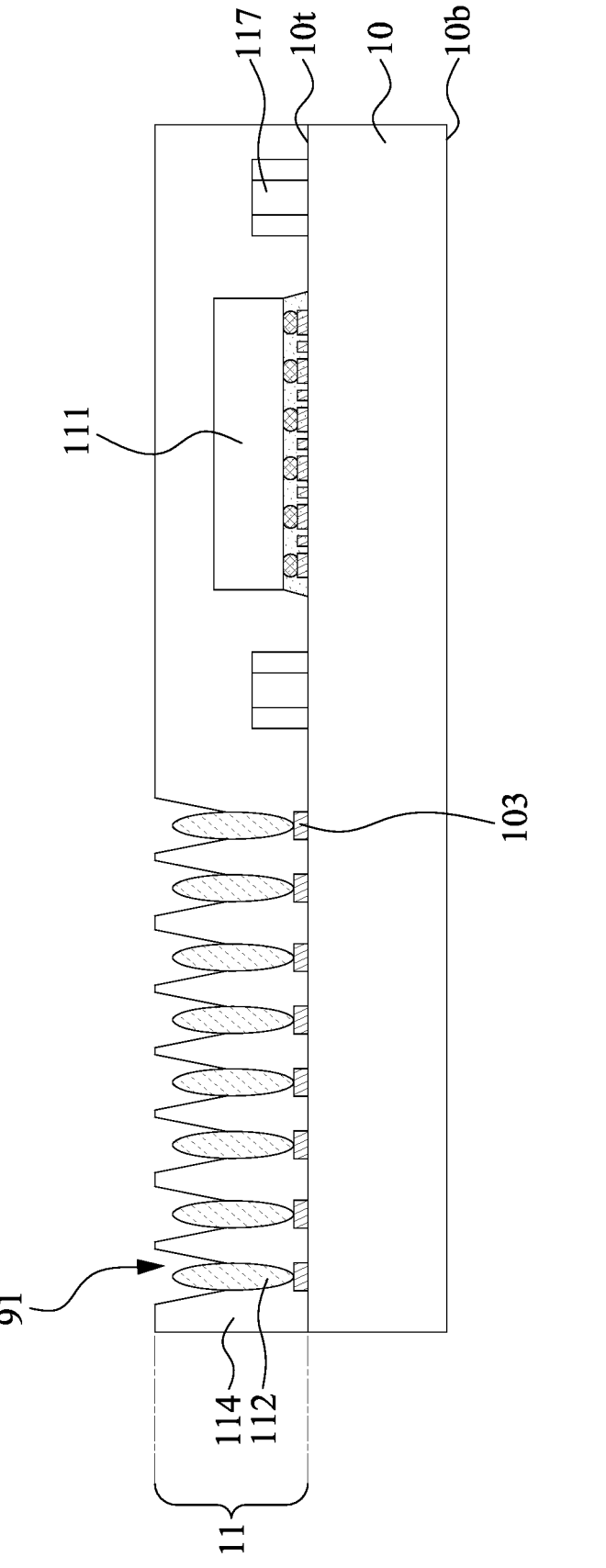
FIG. 11C illustrates a method of manufacturing a semiconductor device package according to some embodiments of the present disclosure.

Referring to FIG. 11C, a portion of the encapsulant 114 is removed during a removal operation. An opening 91 is formed by the removal operation. The removal operation may include laser ablation. The interconnection element 112 is exposed by the opening 91.

Figure 11D:
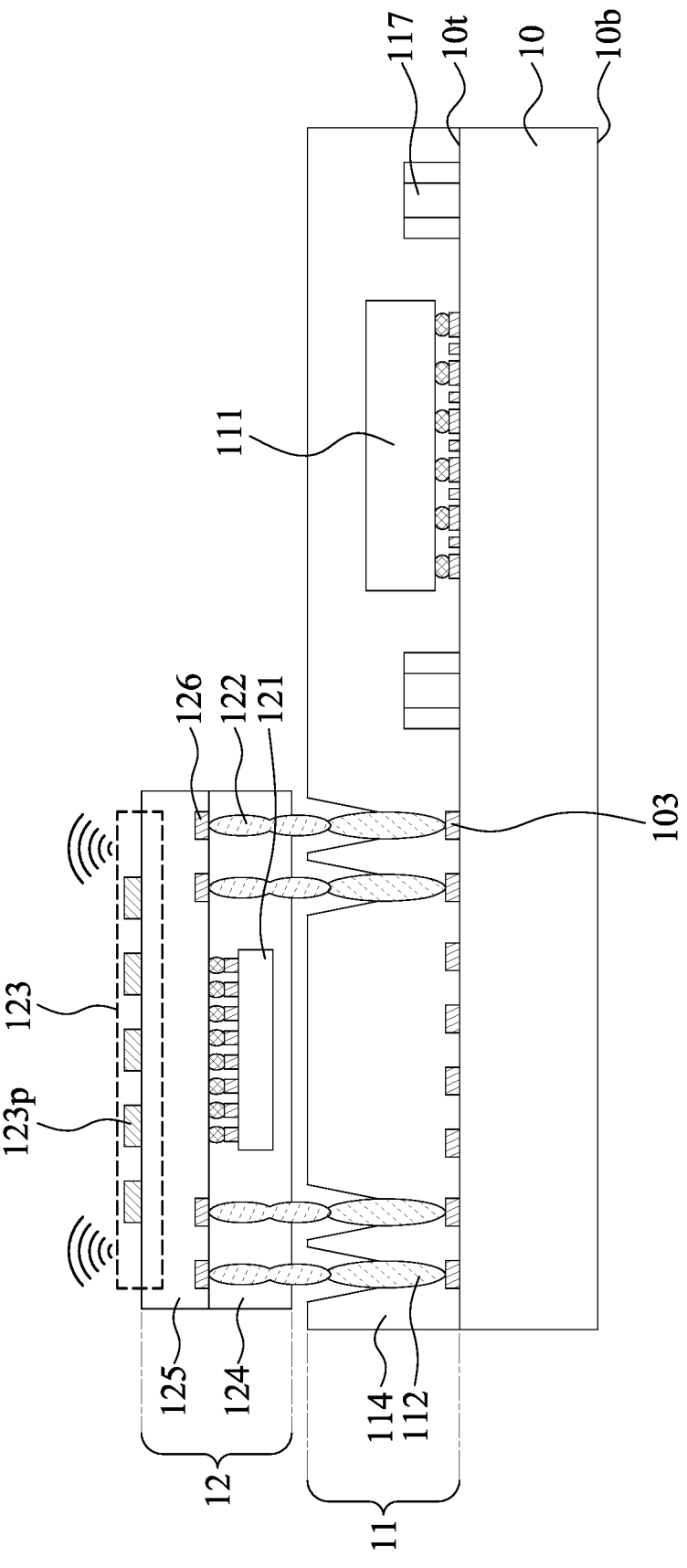
FIG. 11D illustrates a method of manufacturing a semiconductor device package according to some embodiments of the present disclosure.

Referring to FIG. 11D, a detecting module 12 is disposed on the encapsulant 114. The detecting module 12 includes an active component 121, an interconnection element 122, an antenna 123, an encapsulant 124, a carrier 125, and a patterned conductive layer 126. The active component 121 and the antenna 123 are integrated into the detecting module 12. The detecting module 12 is configured to control the control module 11.

The carrier 125 may be a substrate. The carrier 125 includes a top surface and a bottom surface opposite thereto. The patterned conductive layer 126 is adjacent to the bottom surface of the carrier 125. The carrier 125 is smaller than the substrate 10.

The interconnection element 122 is disposed on the bottom surface of the carrier 125. The interconnection element 122 may include a conductive post, conductive pillar, or solder ball. The interconnection element 122 is in contact with the interconnection element 112. The interconnection element 112 and the interconnection element 122 may transmit digital or RF signals.

The encapsulant 124 is disposed on the bottom surface of the carrier 125 and encapsulates the active component 121 and the interconnection element 122.

The antenna 123 is disposed on the top surface 10t of the substrate 10. The antenna 123 is adjacent to the top surface of the carrier 125. The antenna 123 includes a plurality of antenna units 123p. The antenna units 123p may radiate an electromagnetic wave toward an object or receive one or more electromagnetic waves reflected from the object. The antenna 123 is electrically connected to the active component 121. The antenna 123 may operate in a frequency band around 60 GHz to around 64 GHz.

The active component 121 is disposed on the top surface 10t of the substrate 10. The active component 121 is adjacent to the bottom surface of the carrier 125. The active component 121 may include one or more of a controller, processor, digital signal processor (DSP), application-specific integrated circuit (ASIC), or other component or semiconductor device. The active component 121 may be a radar controller or a gesture/motion-detecting controller.

Subsequently, a singulation operation is performed to form the semiconductor device package 1.

Figure 12A:
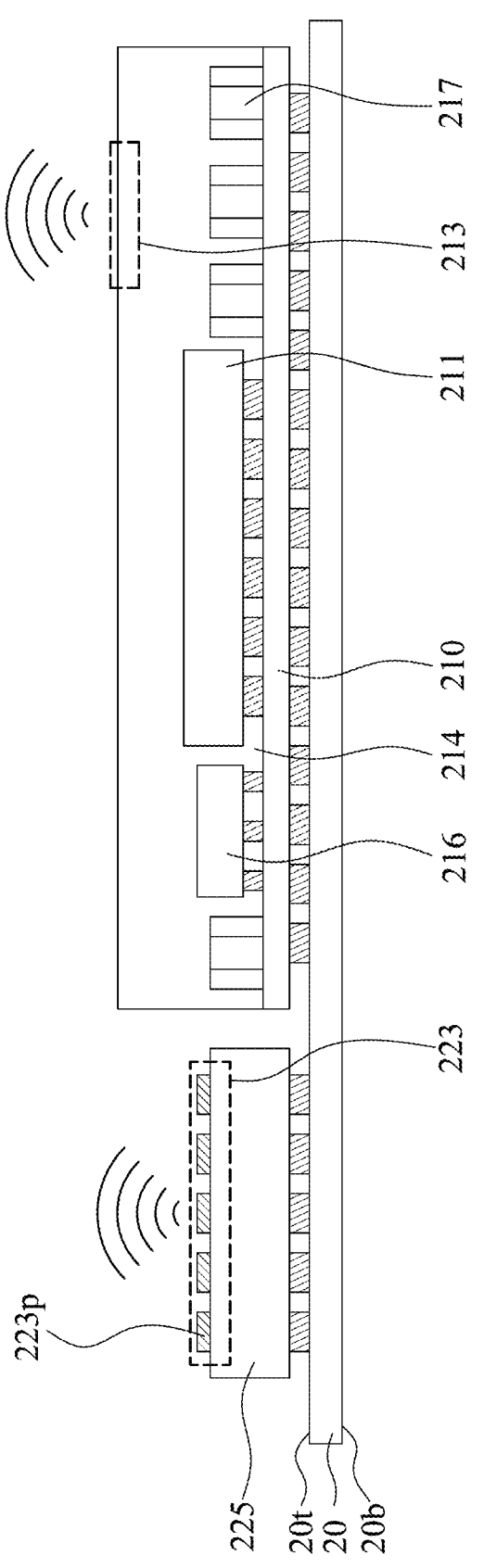
FIG. 12A illustrates a method of manufacturing a semiconductor device package according to some embodiments of the present disclosure.
Figure 12B:
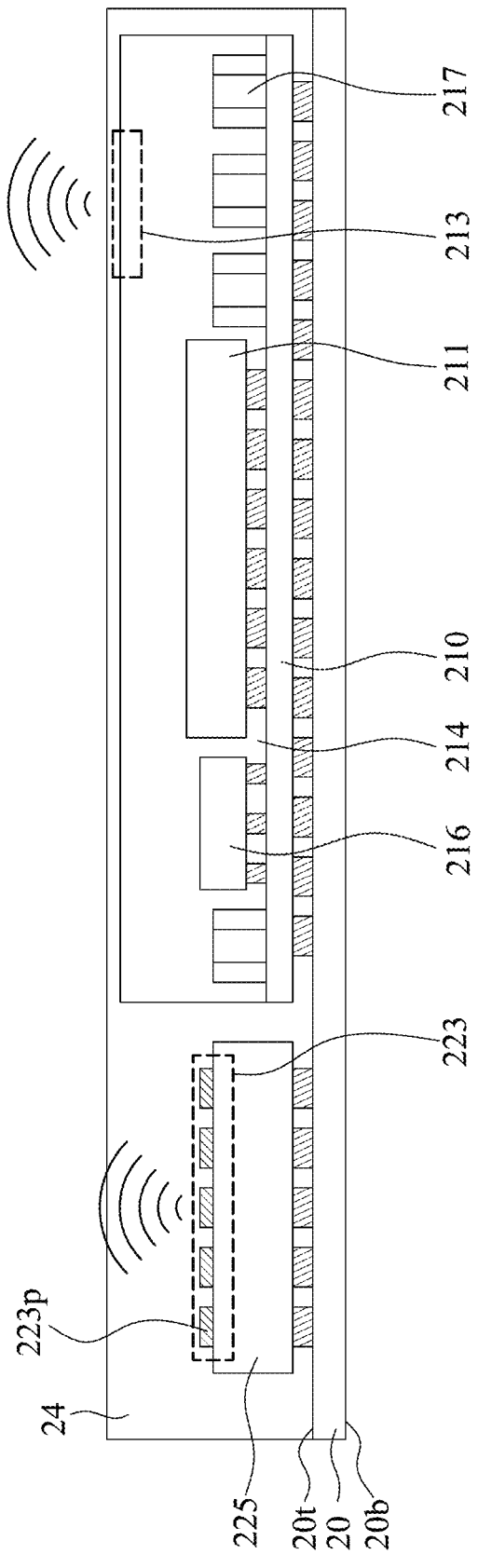
FIG. 12B illustrates a method of manufacturing a semiconductor device package according to some embodiments of the present disclosure.
Figure 12C:
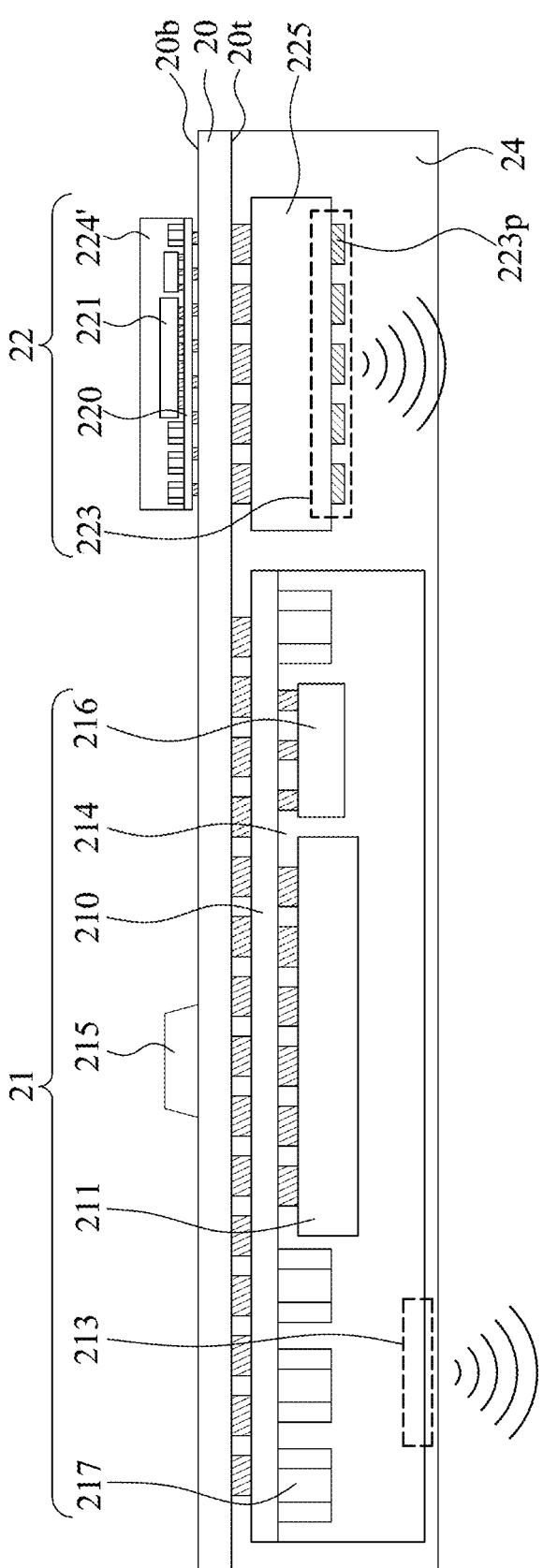
FIG. 12C illustrates a method of manufacturing a semiconductor device package according to some embodiments of the present disclosure.

FIG. 12A through FIG. 12C illustrate some embodiments of a method of manufacturing the semiconductor device package 2 according to some embodiments of the present disclosure.

Referring to FIG. 12A, a method for manufacturing the semiconductor device package 2 includes providing a substrate 20. The substrate 20 includes a top surface 20t and a bottom surface 20b opposite thereto.

A control module 21 is disposed on the top surface 20t of the substrate 20. The control module 21 is electrically connected to the substrate 20. The control module 21 includes a carrier 210, an active component 211, an antenna 213, an encapsulant 214, an active component 216, and a passive component 217.

The carrier 210 may be a substrate. The carrier 210 is smaller than the substrate 20. The carrier 210, the active component 211, the antenna 213, the active component 216, and the passive component 217 are encapsulated by the encapsulant 214.

The active component 211 is disposed on a top surface of the carrier 210 which faces away from the substrate 20. The active component 211 may include one or more of a controller, processor, digital signal processor (DSP), application-specific integrated circuit (ASIC), or other component or semiconductor device. The active component 211 may be a wearable device controller.

The active component 216 is disposed on a top surface of the carrier 210. A structure of the active component 216 may be similar to the structure of the active component 211.

The antenna 213 is adjacent to a top surface of the encapsulant 214. The antenna 213 is integrated with the active component 211 in the control module 21. The antenna 213 is electrically connected to the active component 211. The antenna 213 may operate in a frequency band around 2 GHz to around 2.4 GHz.

The active component 211 and the antenna 213 are integrated into the control module 21. The active component 216 and the antenna 213 are integrated into the control module 21.

A carrier 225 is disposed on the top surface 20t of the substrate 20. An antenna 223 is disposed on or adjacent to a top surface of the carrier 225. The antenna 223 includes a plurality of antenna units 223p. The antenna units 223p may radiate an electromagnetic wave toward an object or receive one or more electromagnetic waves reflected from the object. The antenna 223 may operate in a frequency band around 60 GHz to around 64 GHz. The carrier 225 and the antenna 223 are integrated into a sub-module of a detecting module 22.

Referring to FIG. 12B, an encapsulant 24 is disposed on the top surface 20t of the substrate 20 during a molding operation. The encapsulant 24 encapsulates the control module 21, the carrier 225, and the antenna 223. The encapsulant 24 may undergo a removal operation. The removal operation utilizes grinding.

Referring to FIG. 12C, another sub-module of the detecting module 22 is disposed on the bottom surface 20b of the substrate 20. The sub-module includes a carrier 220, an active component 221, and an encapsulant 224'.

The carrier 220 is disposed on the bottom surface 20b of the substrate 20. The active component 221 is disposed on a bottom surface of the carrier 220. The active component 221 is encapsulated by the encapsulant 224'. The active component 221 may include one or more of a controller, processor, digital signal processor (DSP), application-specific integrated circuit (ASIC), or other component or semiconductor device. The active component 221 and the antenna 223 are integrated into the detecting module 22.

In some embodiments, an underfill may be disposed between a top surface of the carrier 220 and the bottom surface 20t of the substrate 20.

Subsequently, a singulation operation is performed to form the semiconductor device package 2.

Figure 13A:
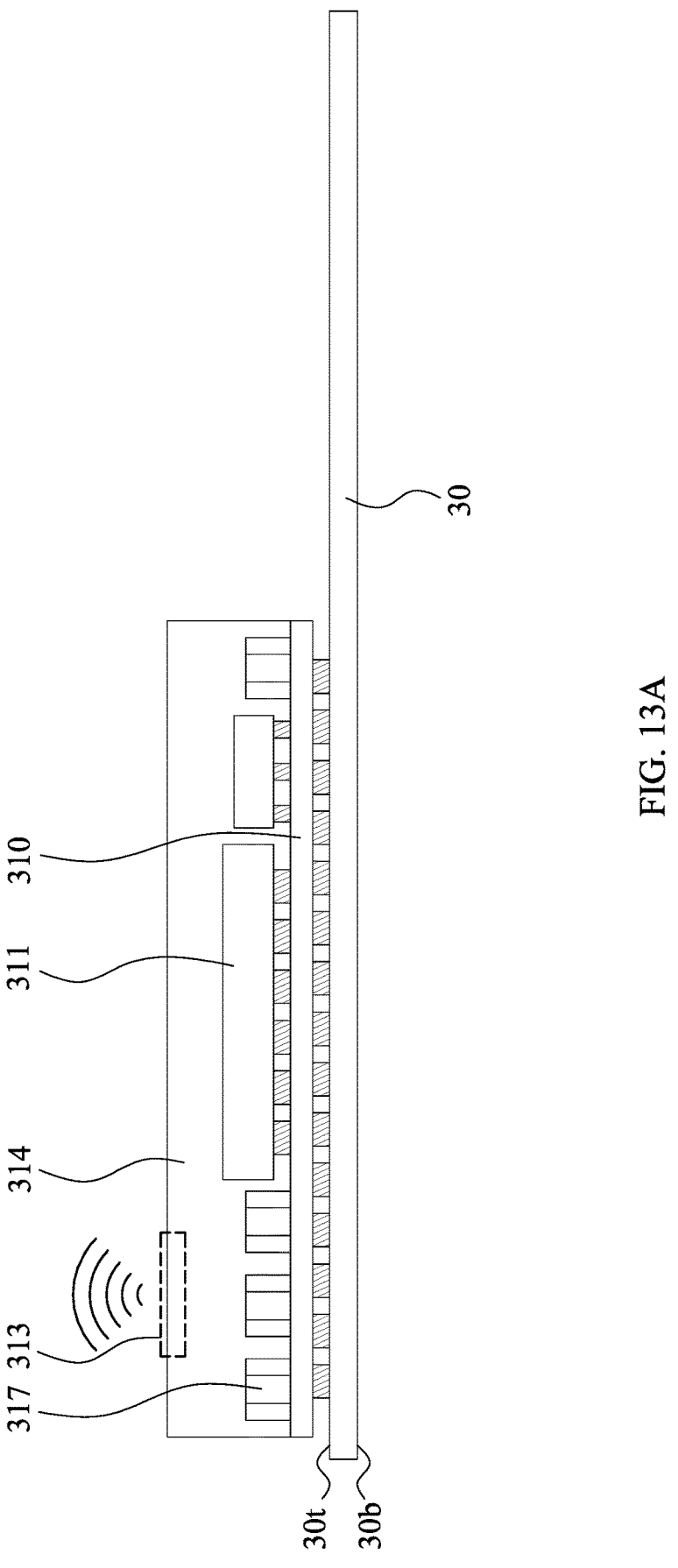
FIG. 13A illustrates a method of manufacturing a semiconductor device package according to some embodiments of the present disclosure.
Figure 13B:
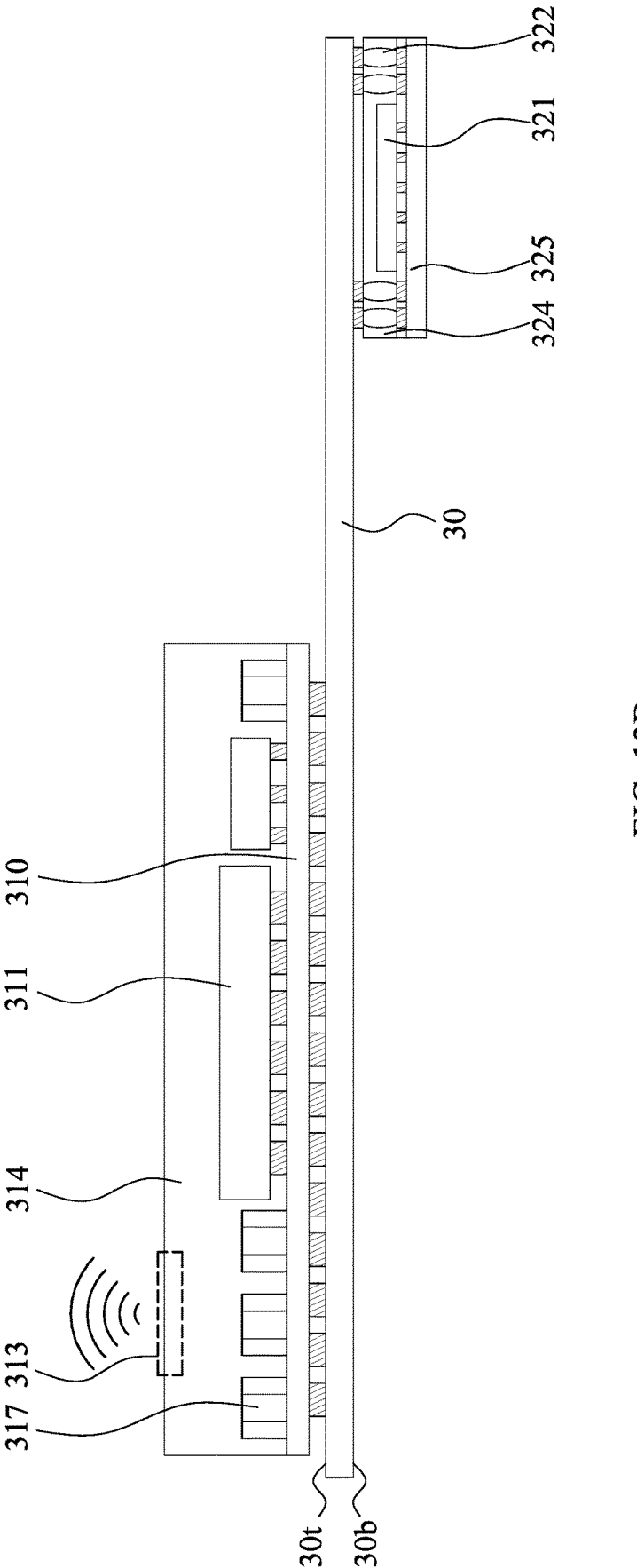
FIG. 13B illustrates a method of manufacturing a semiconductor device package according to some embodiments of the present disclosure.
Figure 13C:
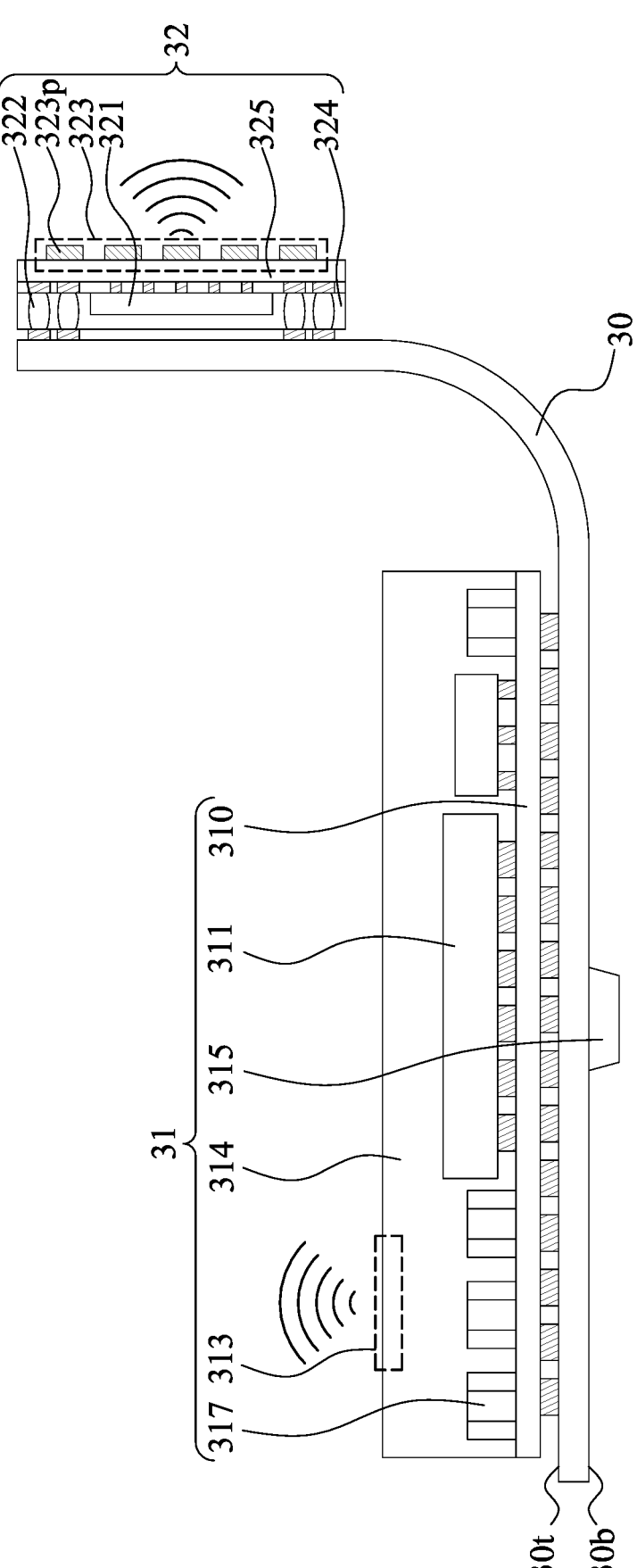
FIG. 13C illustrates a method of manufacturing a semiconductor device package according to some embodiments of the present disclosure.

FIG. 13A through FIG. 13C illustrate some embodiments of a method of manufacturing the semiconductor device package 3 according to some embodiments of the present disclosure.

Referring to FIG. 13A, a method for manufacturing the semiconductor device package 3 includes providing a substrate 30. The substrate 30 includes a top surface 30t and a bottom surface 30b opposite thereto. The substrate 30 may include a FPC board for transmitting digital signals within a frequency band around 2 GHz to around 2.4 GHz.

A control module 31 is disposed on the top surface 30t of the substrate 30. The control module 31 is electrically connected to the substrate 30. The control module 31 includes a carrier 310, an active component 311, an antenna 313, an encapsulant 314, an active component 316, and a passive component 317. Structure, function, or operation of the control module 31 may be similar to those of the control module 21.

Referring to FIG. 13B, a detecting module 32 is disposed on the bottom surface 30b of the substrate 30. The detecting module 32 includes an active component 321, an interconnection element 322, an antenna 323, an encapsulant 324, and a carrier 325. The antenna 323 includes antenna units 323p. Structure, function, or operation of the detecting module 32 may be similar to those of the detecting module 12. The detecting module 32 is configured to control the control module 21.

Referring to FIG. 13C, a singulation operation is performed to form the semiconductor device package 3. The substrate 30 of the semiconductor device package 3 is configured to be bendable, foldable, or twistable to adjust a respective location of the control module 31 and the detecting module 32.

Figure 14A:
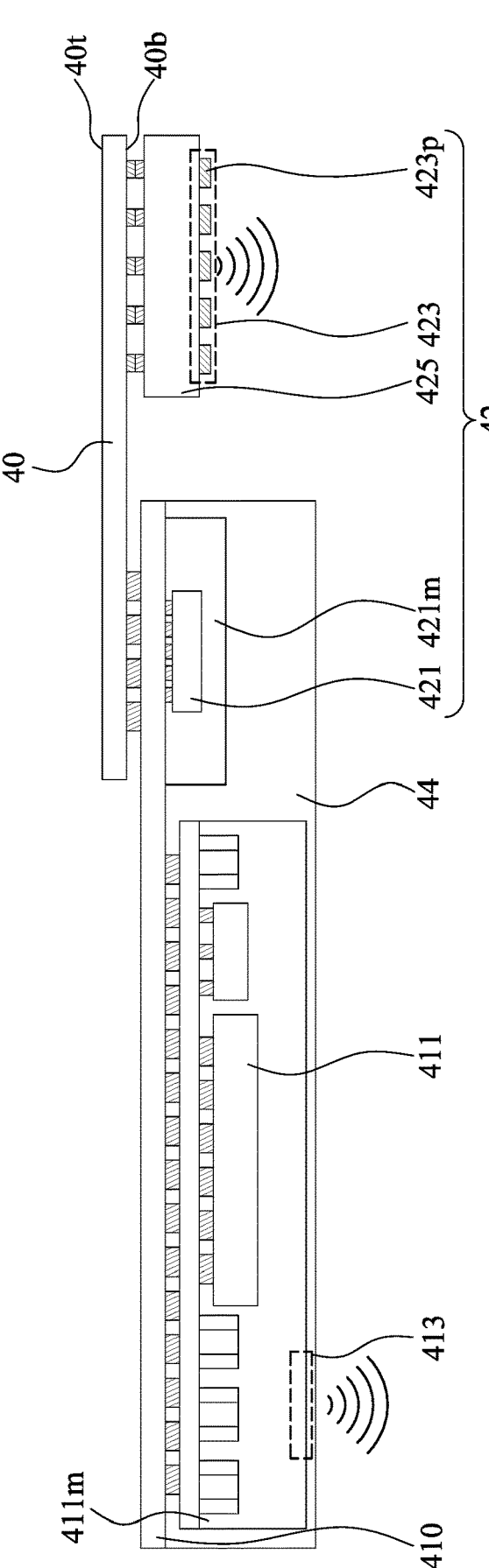
FIG. 14A illustrates a method of manufacturing a semiconductor device package according to some embodiments of the present disclosure.
Figure 14B:
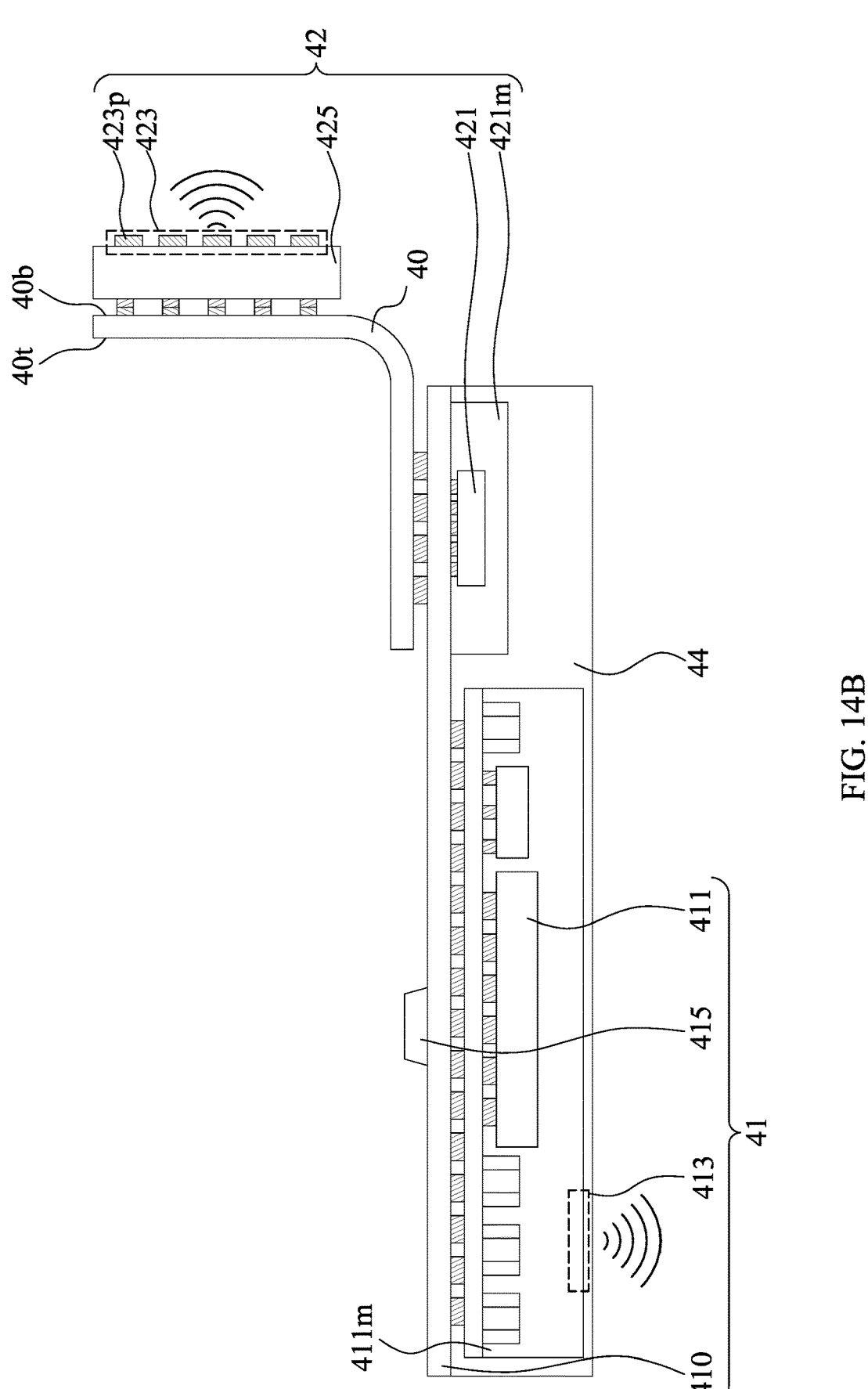
FIG. 14B illustrates a method of manufacturing a semiconductor device package according to some embodiments of the present disclosure.

FIG. 14A through FIG. 14B illustrate some embodiments of a method of manufacturing the semiconductor device package 4 according to some embodiments of the present disclosure.

Referring to FIG. 14A, a method for manufacturing the semiconductor device package 4 includes providing a substrate 40. The substrate 40 includes a top surface 40t and a bottom surface 40b opposite the top surface 40t. The substrate 40 includes a high frequency circuit board for transmitting signals within a high frequency band (e.g., from around 60 GHz to around 64 GHz). The substrate 40 includes a liquid crystal polymer.

A control module 41 is disposed on the bottom surface 40b of the substrate 40. The control module 41 includes a carrier 410, an active component 411, an antenna 413, an encapsulant 414, a sensor device 415, an active component 416, and an encapsulant 416m. Structure, function, or operation of the control module 41 may be similar to those of the control module 21.

A detecting module 42 is disposed on the bottom surface 40b of the substrate 40. The detecting module 42 includes an active component 421, an antenna 423, and a carrier 325. The antenna 423 includes antenna units 423p. Structure, function, or operation of the detecting module 42 may be similar to those of the detecting module 32.

Referring to FIG. 14B, a singulation operation is performed to form the semiconductor device package 4. The substrate 40 of the semiconductor device package 4 is configured to be bendable, foldable, or twistable to adjust a respective location of the control module 41 and the detecting module 42.

Figure 15A:
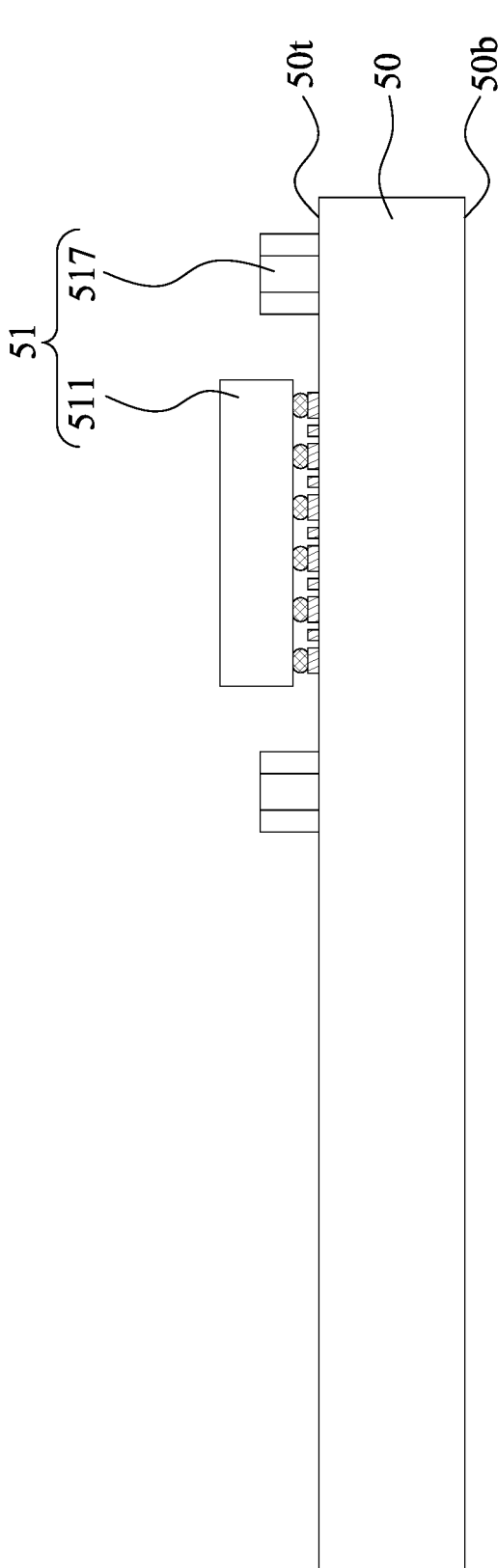
FIG. 15A illustrates a method of manufacturing a semiconductor device package according to some embodiments of the present disclosure.
Figure 15B:
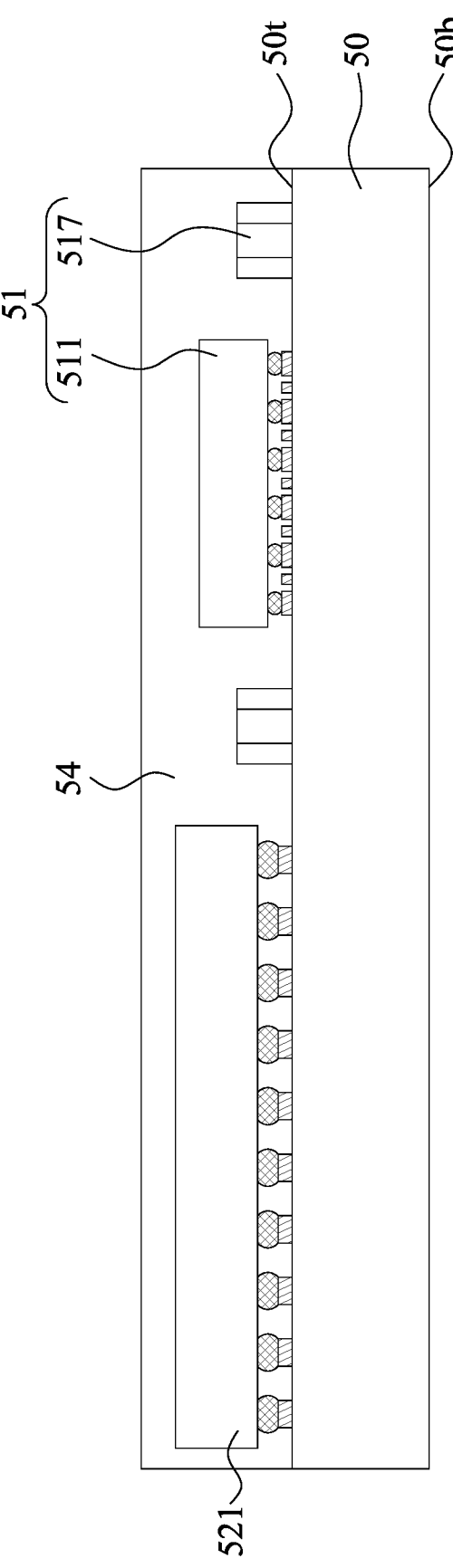
FIG. 15B illustrates a method of manufacturing a semiconductor device package according to some embodiments of the present disclosure.
Figure 15C:
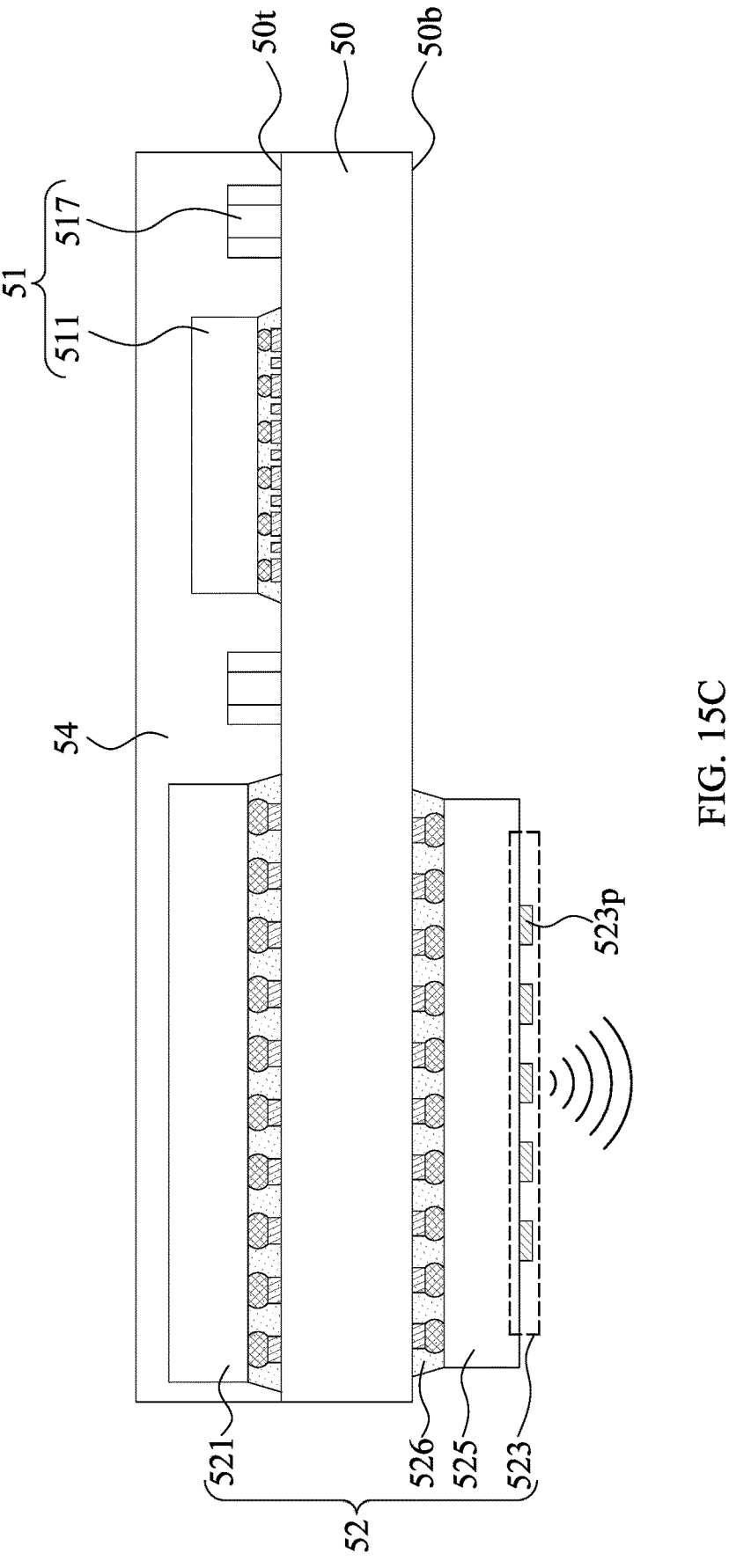
FIG. 15C illustrates a method of manufacturing a semiconductor device package according to some embodiments of the present disclosure.

FIG. 15A through FIG. 15C illustrate some embodiments of a method of manufacturing the semiconductor device package 5 according to some embodiments of the present disclosure.

Referring to FIG. 15A, a method for manufacturing the semiconductor device package 5 includes providing a substrate 50. The substrate 50 includes a top surface 50*t* and a bottom surface 50*b* opposite the top surface 50*t*.

An active component 511 is disposed on the top surface 50*t* of the substrate 50. The active component 511 is electrically connected to the substrate 50. The active component 511 may include one or more of a controller, processor, digital signal processor (DSP), application-specific integrated circuit (ASIC), or other component or semiconductor device. The active component 511 may be a wearable device controller. In some embodiments, an underfill may be disposed on an active surface of the active component 511. The underfill is disposed between the active surface of the active component 511 and the top surface 50*t* of the substrate 50.

In some embodiments, an antenna may be disposed adjacent to the top surface 50*t* of the substrate 50. The antenna may be disposed adjacent to active component 511. The antenna is electrically connected to the active component 511. The antenna may operate in a frequency band around 2 GHz to around 2.4 GHz.

A passive component 517 is disposed on the top surface 50*t* of the substrate 50. The passive component 517 is electrically connected to the substrate 50. The passive component 517 may be a resistor, a capacitor, an inductor, or a combination thereof. The antenna, the active component 511, or the passive component 517 may be integrated into a control module 51.

An active component 521 is disposed on the top surface 50*t* of the substrate 50. The active component 521 is electrically connected to the substrate 50. The active component 521 may include one or more of a controller, processor, digital signal processor (DSP), application-specific integrated circuit (ASIC), or other component or semiconductor device. The active component 521 may be a radar controller or a gesture/motion-detecting controller. The active component 521 is integrated into a sub-module of a detecting module 52.

In some embodiments, an underfill may be disposed on an active surface of the active component 521. The underfill is disposed between the active surface of the active component 521 and the top surface 50*t* of the substrate 50.

Referring to FIG. 15B, an encapsulant 54 is disposed on the top surface 50*t* of the substrate 50. The encapsulant 54 encapsulates the control module 51 and the active component 521. The encapsulant 54 may undergo a removal operation. The removal operation utilizes grinding.

Referring to FIG. 15C, another sub-module of the detecting module 52 is disposed on the bottom surface 50*b* of the substrate 50. The sub-module includes an antenna 523, a carrier 525, and an active component 526. The antenna 523 includes antenna units 523*p*.

The carrier 525 is disposed on the bottom surface 50*b* of the substrate 50. The antenna 523 is disposed on a bottom surface of the carrier 525. The active component 526 may include one or more of a controller, processor, digital signal processor (DSP), application-specific integrated circuit (ASIC), or other component or semiconductor device. The antenna 523, the carrier 525, or the active component 526 are integrated into the sub-module of the detecting module 52.

In some embodiments, an underfill may be disposed between an active surface of the active component 526 and the bottom surface 50*t* of the substrate 50.

Subsequently, a singulation operation is performed to form the semiconductor device package 5.

Figure 16A:
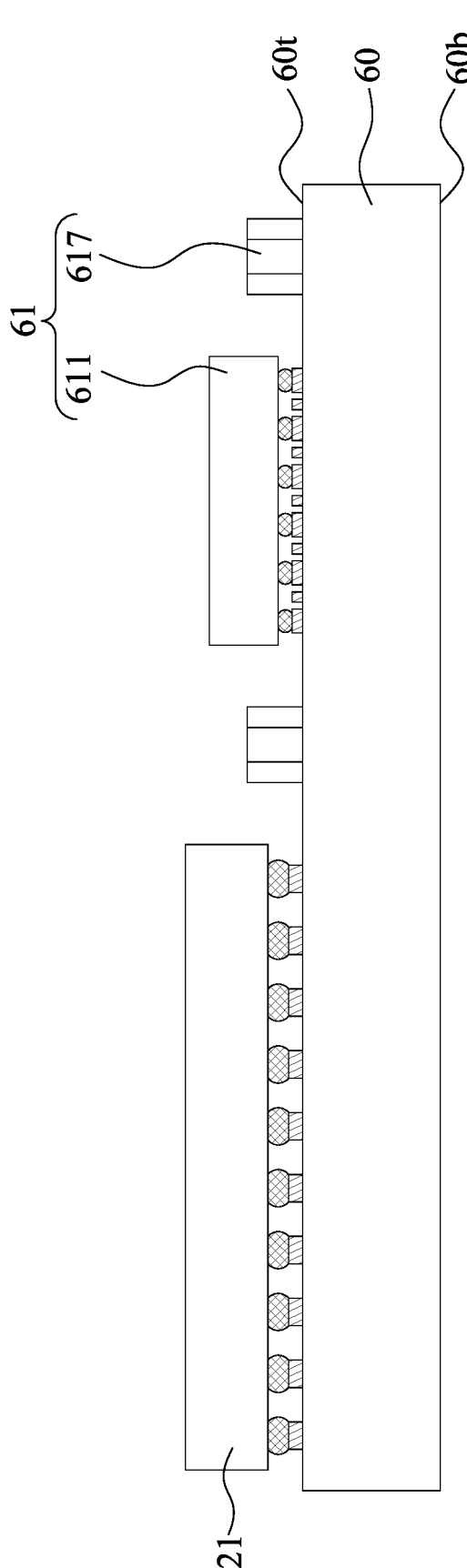
FIG. 16A illustrates a method of manufacturing a semiconductor device package according to some embodiments of the present disclosure.
Figure 16B:
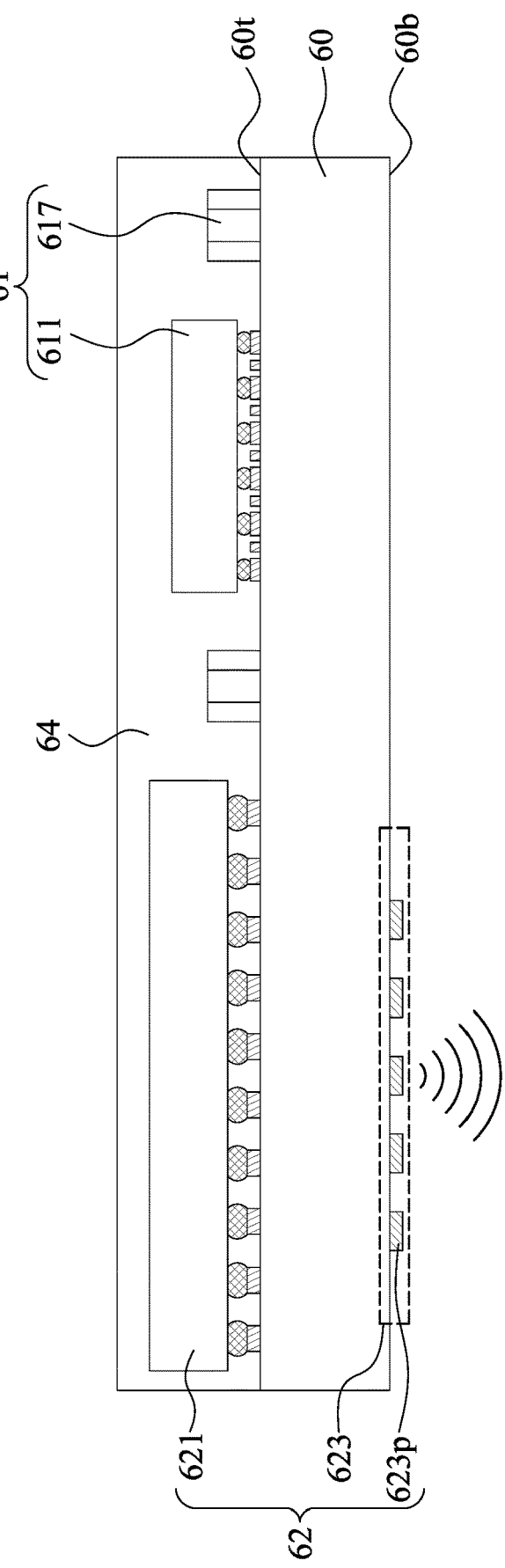
FIG. 16B illustrates a method of manufacturing a semiconductor device package according to some embodiments of the present disclosure.

FIG. 16A through FIG. 16B illustrate some embodiments of a method of manufacturing the semiconductor device package 6 according to some embodiments of the present disclosure.

Operations of FIG. 16A are similar to those of FIG. 15A except that an antenna 623 is disposed adjacent to a bottom surface 60*b* of a substrate 60. The antenna 623 includes antenna units 623*p*. The antenna 623 is integrated into a detecting module 62.

Operations of FIG. 16B are similar to those of FIG. 15B except that a singulation operation is performed to form the semiconductor device package 6.

Figure 17A:
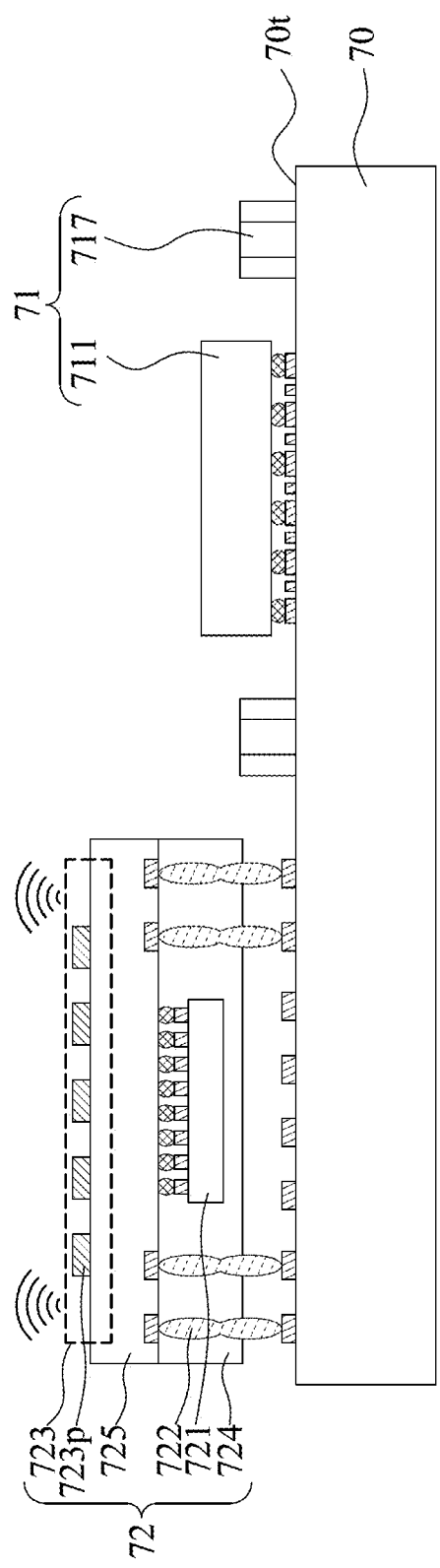
FIG. 17A illustrates a method of manufacturing a semiconductor device package according to some embodiments of the present disclosure.
Figure 17B:
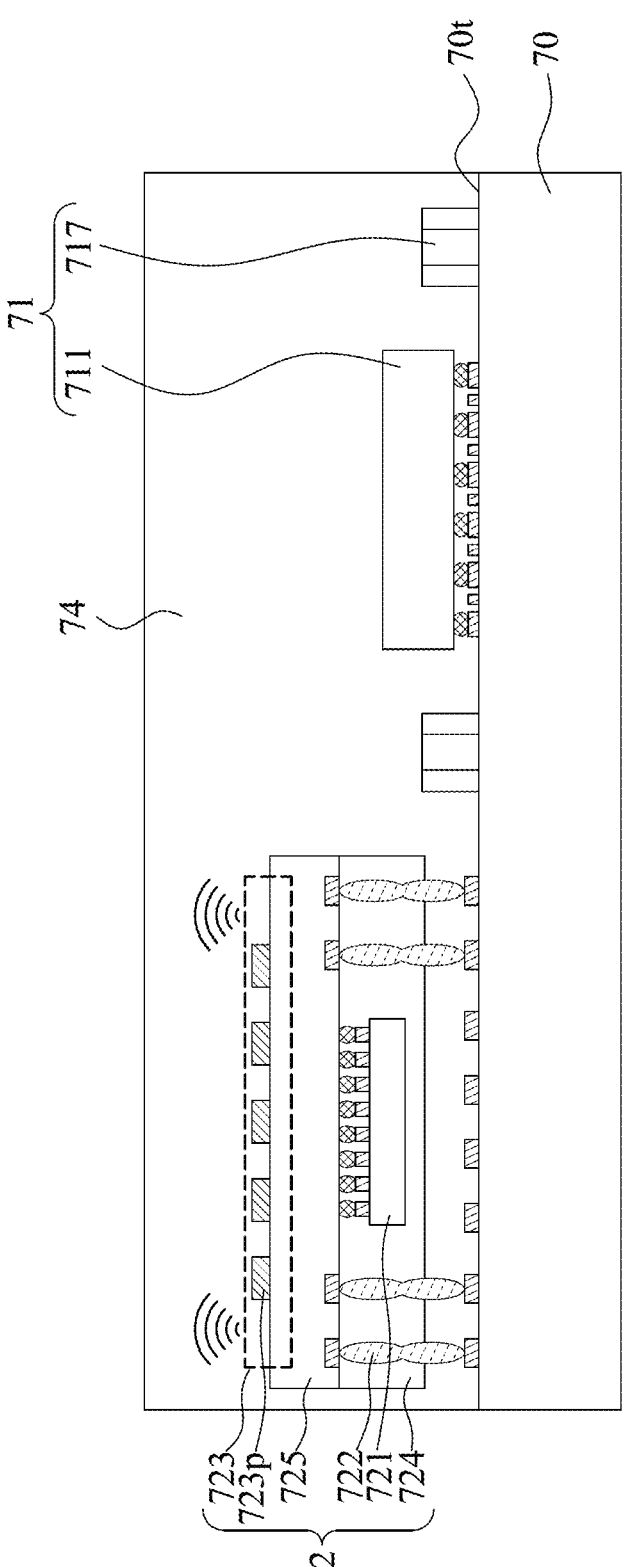
FIG. 17B illustrates a method of manufacturing a semiconductor device package according to some embodiments of the present disclosure.

FIG. 17A through FIG. 17B illustrate some embodiments of a method of manufacturing the semiconductor device package 7 according to some embodiments of the present disclosure.

Operations of FIG. 17A are similar to those of FIG. 15A except that a detecting module 72 is disposed adjacent to a top surface 70*t* of a substrate 70.

The detecting module 72 includes an active component 721, an interconnection element 722, an antenna 723, an encapsulant 724, a carrier 725, and a patterned conductive layer 726. Structure, function, or operation of the detecting module 72 are similar to those of the detecting module 12.

An underfill is disposed between the carrier 725 and the substrate 70. The interconnection element 722 is protected by the underfill. In some embodiments, another underfill is disposed between an active component 711 and the substrate 70.

Operations of FIG. 17B are similar to those of FIG. 16B except that a singulation operation is performed to form the semiconductor device package 7.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. The term "substantially coplanar" can refer to two surfaces within micrometers of lying along a same plane, such as within 40 within 30 within 20 μm, within 10 μm, or within 1 μm of lying along the same plane.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. An electronic apparatus, comprising:
a first substrate having a first surface and a second surface opposite to the first surface;
an antenna module including a first antenna disposed over the first surface of the first substrate and a first electronic component disposed under the second surface of the first substrate, the antenna module being configured to detect a movement of an object;
a control module including a second electronic component disposed over the first surface of the first substrate and a sensor device disposed under the second surface of the first substrate, the control module being electrically connected to the antenna module by the first substrate; and
a first molding encapsulant encapsulating the first antenna of the antenna module and the second electronic component of the control module,
wherein the control module is configured to receive a signal from the antenna module and to control the electronic apparatus in response to the signal.

2. The electronic apparatus of claim 1, wherein the first molding encapsulant connects the first antenna of the antenna module to a second molding encapsulant of the control module.

3. The electronic apparatus of claim 1, wherein a portion of the first molding encapsulant is disposed between the first antenna of the antenna module and the second electronic component of the control module.

4. The electronic apparatus of claim 1, wherein a first portion of the first molding encapsulant is disposed between the first substrate and the first antenna of the antenna module, and a second portion of the first molding encapsulant is disposed between the first substrate and the second electronic component of the control module.

5. The electronic apparatus of claim 1, wherein a lateral surface of the first molding encapsulant is substantially aligned with a lateral surface of the first substrate.

6. The electronic apparatus of claim 1, wherein the control module includes a second molding encapsulant encapsulating the second electronic component and a second antenna, and wherein the second antenna of the control module is disposed over the first surface of the first substrate.

7. The electronic apparatus of claim 6, wherein a vertical projection of the sensor device overlaps a vertical projection of the second electronic component from a cross sectional perspective, and the sensor device is free from encapsulation by the first molding encapsulant.

8. The electronic apparatus of claim 7, wherein the first substrate includes a waveguide and a radio hole exposing the waveguide, and the waveguide is connected to the sensor device.

9. The electronic apparatus of claim 8, wherein the waveguide extends from the first surface to the second surface of the first substrate.

10. The electronic apparatus of claim 8, wherein the radio hole and the sensor device are disposed at different sides of the waveguide.

11. The electronic apparatus of claim 6, wherein an elevation of the first antenna of the antenna module is lower than the second antenna of the control module with respect to the first substrate.

12. The electronic apparatus of claim 6, wherein the second molding encapsulant is encapsulated by the first molding encapsulant.

13. The electronic apparatus of claim 1, wherein the antenna module comprises:
a second substrate disposed under the second surface of the first substrate and supporting the first electronic component; and
a third molding encapsulant disposed under the second surface of the first substrate and encapsulating the first electronic component of the antenna module.

14. The electronic apparatus of claim 13, wherein the third molding encapsulant is spaced apart from the first substrate by the second substrate of the antenna module.

15. The electronic apparatus of claim 13, further comprising a housing covering the first molding encapsulant and the third molding encapsulant.

16. The electronic apparatus of claim 15, wherein the electronic apparatus is configured to be worn by a user, and the antenna module faces away from the user with respect to the first substrate.

17. The electronic apparatus of claim 15, wherein the housing includes an upper portion and a lower portion, the antenna module and the control module are disposed in the lower portion, and the electronic apparatus further comprises a battery disposed within the upper portion.

18. The electronic apparatus of claim 17, wherein the control module is closer to the upper portion than the antenna module.

19. The electronic apparatus of claim 1, wherein a distance between the antenna module and an upper surface of the first molding encapsulant is greater than a distance between the control module and the upper surface of the first molding encapsulant.

* * * * *